US008194858B2

(12) United States Patent
Bukshpun et al.

(10) Patent No.: US 8,194,858 B2
(45) Date of Patent: Jun. 5, 2012

(54) CHAOTIC CIPHER SYSTEM AND METHOD FOR SECURE COMMUNICATION

(75) Inventors: Leonid Bukshpun, Encino, CA (US); Thomas Forrester, Hacienda Heights, CA (US); Tomasz Jannson, Torrance, CA (US); Andrew Kostrzewski, Garden Grove, CA (US); Alexander Milovanov, Torrance, CA (US); Ranjit Pradhan, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 379 days.

(21) Appl. No.: 12/626,533

(22) Filed: Nov. 25, 2009

(65) Prior Publication Data

US 2010/0211787 A1      Aug. 19, 2010

Related U.S. Application Data

(60) Provisional application No. 61/153,921, filed on Feb. 19, 2009, provisional application No. 61/239,725, filed on Sep. 3, 2009.

(51) Int. Cl.
*H04L 9/00* (2006.01)
*H04L 1/00* (2006.01)
*H04L 9/08* (2006.01)
*H04L 9/32* (2006.01)

(52) U.S. Cl. .......... 380/277; 380/44; 380/268; 380/273; 380/278; 380/281; 713/171

(58) Field of Classification Search .................... 380/44, 380/46, 268, 273, 277, 278, 281; 713/171
See application file for complete search history.

(56) References Cited

OTHER PUBLICATIONS

Mihir Bellare, Improved Security Analyses for CBC MAC's, V. Shoup (Ed.): Crypto 2005, LNCS 3621, pp. 527-545, 2005.
Mihir Bellare, The Security of Triple Encryption and a Framework for Code-Based Game-Playing Proofs, S. Vaudenay (Ed.): Eurocrypt 2006, LNCS 4004, pp. 409-426, 2006.
Mihir Bellare, Deterministic and Efficiently Searchable Encryption, a. Menezes (Ed.): Crypto, 2007, LNCS 4622 pp. 535-552, 2007.
Mihir Bellare, Definitional Equivalences and Constructions without Random Oracles, D. Wagner (Ed.): Crypto 2008, LNCS 5157, pp. 360-378, 2008.
John Black, CBC MACs for Arbitrary-Length Messages: The Three-Key Constructions, J. Cryptology (2005) 18: 111-131, DOI: 10.1007/s00145-004-0016-3, Journal of Cryptology.
John Black, Ciphers with Arbitrary Finite Domains, B. Preneel (Ed.): CT-RSA 2002, LNCS 2271, pp. 114-130, 2002, Springer-Verlag Berlin Heidelberg 2002.
J. Black, Umas: Fast and Secure Message Authentication, Michael Wiener (Ed.): Crypto'99, LNCS 1666, pp. 216-233, 1999, Springer-Verlag Berlin Heidelberg 1999.

(Continued)

*Primary Examiner* — Mohammad Reza
(74) *Attorney, Agent, or Firm* — Sheppard Mullin Richter & Hampton LLP

(57) ABSTRACT

The present invention provides a method for a data encryption device to perform network communications, the method comprising obtaining an indexed array of encryption keys, wherein the indexed array of encryption keys is shared with a data decryption device; obtaining a message to be encrypted; using a first random or pseudorandom number to determine an index; obtaining a first key from the array of encryption keys, wherein the first key corresponds to the index; selecting a second key from the plurality of encryption keys; encrypting the message using the first key and a second random or pseudorandom number; encrypting the index using the second key and a third random or pseudorandom number; transmitting the encrypted message and the encrypted index to the data decryption device.

65 Claims, 16 Drawing Sheets

OTHER PUBLICATIONS

John Black, A Block-Cipher Mode of Operation for Parallelizable Message Authentication, L.R. Knudsen (Ed.): Eurocrypt 2002, LNCS 2332, pp. 384-397, 2002. Springer-Verlag Berlin Heidelberg 2002.

Alexandra Boldyreva, On Notions of Security for Deterministic Encryption, and Efficient Constructions without Random Oracles, D. Wagner, (Ed.): Crypto 2008, LNCS 5157, pp. 335-359, 2008. International Association for Cryptologic Research 2008.

International Standard, Identification cards—Identification of issuers—Part 1: Numbering System, ISO/IES 7812-1, Third Edition, Oct. 15, 2006.

Tetsu Iwata, OMAC: One-Key CBC MAC, T. Johnson (Ed.): FSE 2003, LNCS 2887, pp. 129-153, 2003. International Association for Cryptologic Research 2003.

Moses Liskov, Tweakable Block Ciphers, M. Yung (Ed.): Crypto 2002, LNCS 2442, pp. 31-46, 2002. Springer-Verlag Berlin Heidelberg 2002.

Michael Luby, How to construct Pseudorandom Permutations From Pseudorandom Functions, Siam J. Comput, vol. 17, No. 2. Apr. 1988, pp. 373-386, 1988 Society for Industrial and Applied Mathematics.

Stefan Lucks, Faster Luby-Rackoff Ciphers, pp. 189-203.

Ueli Maurer, The Security of Many-Round Luby-Rackoff Pseudo-Random Permutations, E. Biham (Ed.): Eurocrypt 2003, LNCS 2656, pp. 544-561, 2003. International Association for Cryptologic Research 2003.

Moni Naor, On The Construction of Pseudorandom Permutations: Luby-Rackoff Revisited, J. Cryptology (1999) 12: 29-66, Journal of Cryptology, 1999 International Association for Cryptologic Research.

Jacques Patarin, New Results on Pseudorandom Permutation Generators Based On The Des Scheme, J. Feigenbaum (Ed.): Advances in Cryptology—Crypto '91, LNCS 576, pp. 301-312, 1992. Springer-Verlad Berlin Heidelberg 1992.

Jacques Patarin, Generic Attacks on Feistel Schemes, C. Boyd (Ed.): Asiacrypt 2001, LNCS 2248, pp. 222-238, 2001. Springer-Verlag Berlin Heidelberg 2001.

Jacques Patarin, Luby-Rackoff: 7 Rounds Are Enough for $2n(1-\epsilon)$ Security, D. Boneh (Ed.): Crypto 2003, LNCS 2729, pp. 513-529, 2003. International Association for Cryptologic Research 2003.

Jacques Patarin, Security of Random Feistel Schemes with 5 or More Rounds. M. Franklin (Ed.): Crypto 2004, LNCS 3152, pp. 106-122, 2004. International Association for Cryptologic Research 2004.

Sarvar Patel, Efficient Constructions of Variable-Input-Length Block Ciphers. H. Handschuh and A. Hasan (Eds.): SAC 2004, LNCS 3357, pp. 326-340, 2005. Springer-Verlag Berlin Heidelberg 2005.

PCI Security Standards Councii, Payment Card Industry (PCI) Data Security Standard. Requirements and Security Assessment Procedures, Version 1.2, Oct. 2008.

Bruce Schneier, Unbalanced Feistel Networks and Block Cipher Design, pp. 121-144.

Rich Schroeppel, Hasty Pudding Cipher Specification, Jun. 1998.

Terence Spies, Feistel Finite Set Encryption Mode, pp. 1-10.

Ulf T. Mattsson, Format-Controlling Encryption Using Datatype-Preserving Encryption, pp. 1-46.

Ulf T. Mattsson, DB2 Security and PCI Compliance, A Best Practices Guide, pp. 1-15.

Maruti Venkat Kartik Satti, A Quasigroup Based Cryptographic System, pp. 1-22.

Cisco Systems, Security Help Topics, pp. 1-3.

David H. Crocker, Standard for the Format of Arpa Internet Text Messages, pp. 1-50.

CHAOTIC CIPHER SYSTEM AND METHOD FOR SECURE COMMUNICATION

CROSS-REFERENCE TO RELATED APPLICATIONS

This application claims the benefit of U.S. Provisional Applications No. 61/153,921, filed Feb. 19, 2009, and No. 61/239,725, filed Sep. 3, 2009.

TECHNICAL FIELD

The present invention relates generally to communication and storage, and more particularly, some embodiments are related to systems and methods to secure information for communication and storage.

DESCRIPTION OF THE RELATED ART

In cryptography, encryption is a process used to secure data for transmission. The process transforms clear text information using a cipher algorithm into an alternative form referred to as ciphertext. The algorithm uses a key, or pad, that is mathematically combined with the clear text to result in the encrypted ciphertext data. In theory, the original plaintext data cannot be recovered from the ciphertext without the key. However, in reality, most ciphers can be broken given enough time and processing power.

Encryption has long been used in both government and commercial settings to facilitate secure data communication. Today, encryption has become a ubiquitous part of contemporary society and is heavily employed in numerous government and civilian applications, including computer and storage systems, networks, the Internet, wireless home networks, mobile handsets, Bluetooth® devices, garage door openers, digital rights management, and so on. Encryption can be used to help secure the privacy of data being transferred, but other techniques are used to protect the integrity and authenticity of a message. These techniques can include the use of a digital signature, or a message authentication code (MAC).

A few simple classical ciphers are transposition ciphers and substitution ciphers. Transposition ciphers scramble the order of letters in a message according to a key code that is shared with the intended recipient. Substitution ciphers, in contrast, replace letters or symbols with different letters or symbols. One example substitution cipher is a shift cipher, sometimes referred to as the Caeser Cipher, in which the letters of the alphabet in the plaintext message are replaced by letters shifted a given number of positions to the left or right in the alphabet.

However, because these and other types of ciphers result in ciphertext that contains information about the plaintext message, they can ultimately be broken. For example, with substitution ciphers, the attacker can use frequency analysis, word patterns or brute-force methods to break the code. For example, the user might identify the most used letter in the ciphertext and try replacing it with the most used letter in the English alphabet such as E, A or T. The attacker can look at the position of the letters to make a more intelligent guess about the substitution. Because the substitution applies equally for each of a given letter, the code is relatively easy to break.

As noted, cryptography relies on keys to encrypt and decrypt information. Accordingly, for a recipient to be able to decipher and read the received information both the sender and receiver must have a key. With symmetric cryptography, the same key is used for encryption and decryption operations. Accordingly, this key must be maintained in secrecy by the sender and receiver, for if it is leaked out, others will be able to use it to decrypt secret messages. This requires the sender and receiver to share the key in advance in a secure manner, which can present some practicality problems. Symmetric cryptography, then, is often referred to as private-key cryptography.

Public-key cryptography, on the other hand, is a form of asymmetric cryptography in which the key used to encrypt the plaintext is different from the key used for decryption. In early 2008, the P1363 Working Group of the IEEE Microprocessor Standards Committee published a draft standard specifying public-key cryptographic techniques. With public key cryptography, a public key and a private key are used, and they are different from one another. The private key is held by the recipient and used to decrypt the received cipher text information. Only the private key can be used to decrypt the messages. The public key, used to encrypt the information, is distributed by the recipient to a plurality of senders and can be shared freely. Even though messages are encrypted with the public key, they cannot be decrypted without the private key. Accordingly, the private key is maintained in secret by the recipient. In such a scheme, the recipient can distribute his or her public encryption key freely, and this public key cannot be used to decrypt messages.

The only proven unbreakable encryption method available is the One-Time Pad, or OTP. With the one-time pad cipher, a random pad (or key) is used that is the same length as the data to be encrypted, and the pad is used only once. To encrypt the data, each character of the data is somehow combined with a corresponding character of a key that has been previously generated, delivered and saved in memory. The resulting character is the encrypted data character. For example, for a binary bit string, the pad is a string of binary digits the same length as the string. Each bit in the cleartext string is modulo 2 added (an XOR function for binary data) to its corresponding bit in the key, resulting in an encrypted output the same length as the clear text input. Living up to its name, after using the key to encrypt a bit string, the key is immediately destroyed for security reasons. If same key is used twice, the encryption can be broken.

Because the key is the same size as the plaintext, each conceivable plaintext output is equally likely, rendering the code virtually unbreakable. For example, depending on the key, the ciphertext GKNQ could decrypt to BALL, GOAT, SEAM, or other four letter output. The same holds true for other length messages as long as the pad is the same length as the message. With other conventional algorithms, such as DES, AES, or RSA, the correct key is more likely identifiable because only one key typically produces a reasonable plaintext output. Unlike simple substitution codes, for example, one-time pads are secure because the encrypted text, or ciphertext, provides no information about the original text, or clear text, except the length of the string.

In One-time pad, the key has to be generated and shared between the encryption engine and the decryption engine prior to use; and it must be the same length or longer than the transmitted sequence. Accordingly, the one-time pad leads to keys of unwieldy lengths and results in key-management issues that must be addressed. In addition, the key should be immediately destroyed after use and new random keys created and delivered for each message in a secure manner. To achieve perfect security, however, a source of completely unpredictable random data is needed. In other words, for a one-time pad, the pad data should exhibit perfect randomness, which can be measured by its entropy.

The Data Encryption Standard (DES) is a cipher that is based on a symmetric-key algorithm that uses a 56-bit key.

DES was an official Federal Information Processing Standard (FIPS), but has been surpassed by other techniques considered more secure. DES is a block cipher that takes a fixed-length 64-bit string of plaintext bits and transforms it through a series of operations into an encrypted bitstring of the same length. DES also uses a key in performing the encryption to provide a measure of security to the ciphertext string. Although the key is 64 bits in length, only 56 of those are actually used by the algorithm, and the remaining eight bits are used for checking parity.

DES uses 16 stages of processing, referred to as "rounds." According to DES, the 64-bit block of clear text data is divided into two 32-bit halves. These halves are processed alternately in a Feistel function. In the first round, the Feistel-function scrambles a first one of the 32-bit halves with a part of the key. The output of this operation is then combined with the other 32-bit half of the block. In the next round, the Feistel-function scrambles the output of the previous round and this result is combined with the first one of the 32-bit halves. This process of alternating halves through the Feistel function and combining the Feistel output with alternating ones of the previous round output is continued for the remaining rounds. Because with this scheme the subkeys used in the rounds can be applied in reverse order, encryption and decryption can be similar algorithms.

The Advanced Encryption Standard (AES), is the block cipher chosen by NIST as the replacement for DES. Unlike DES, AES does not use a Feistel structure. In the Feistel Structure, segments of the bits of an intermediate state are simply transposed unchanged to the next state. In AES, the round transformation is composed of three distinct invertible uniform transformations, called layers. These are uniform in that every bit of the state is treated similarly.

The different layers, based to some extent on the Wide Trail Strategy [Da95], each have their own function. A linear mixing layer provides high diffusion over multiple rounds. A non-linear layer provides a parallel application of S-boxes that have optimum worst-case nonlinearity properties. Finally, a key addition layer provides an XOR of the Round Key to the intermediate State. In order to make the cipher and its inverse more similar in structure, the linear mixing layer of the last round is different from the mixing layer in the other rounds.

Security in traditional network communications (and particularly in wireless network communication) is based on encrypting mechanisms using a secure key. It was shown recently, that any size key could be cracked given enough time and resources. Trust in conventional networks can only be partly addressed using expensive methods and algorithms. The main disadvantage of conventional cryptographic systems is that they can be described by a system of algebraic equations. By solving these equations, the key can potentially be recovered. The XSL attack (first instance in July 2003) operates by first analyzing the internals of a cipher and also deriving a system of quadratic simultaneous equations (for example, 8,000 equations with 1,600 variables for the 128-bit AES). The variables represent not just the plaintext, ciphertext, and key bits, but also various intermediate values within the algorithm. A notable distinction of the approach is that only a small number of known plaintexts are necessary in the breaking process, which is in sharp contrast to other state-of-the-art (SOTA) methods of code breaking. The simple fact that an analytic method has been developed to attack block ciphers such as AES shows that the days of these methods are numbered, and indicates the critical importance of new and advanced methods that change the game, so to speak, of ciphers and cryptanalysis.

The S-box of AES appears to be especially vulnerable to this type of analysis, as it is based on the algebraically simple inverse function. Unlike other forms of cryptanalysis, such as differential and linear cryptanalysis, only one or two known plaintexts are required. By solving the system of equations (several methods for solving such systems are known), it is claimed that XSL can break the AES and Serpent 256-bit ciphers central to modern electronic communication. Attacks have been developed for block ciphers and stream ciphers.

As other examples, it was shown that a particular public key algorithm—known as the Hidden Field Equations scheme (HFE)—could be reduced to a system of overdefined quadratic equations. The researchers also found a way to break the SHA-1 algorithm in significantly fewer tries than previously require. The fastest known attack on DES is an algebraic attack that is capable of recovering keys from up to 6 complete DES rounds. It requires only one single known plaintext (instead of a very large quantity) and a commodity PC for recovery of the 6-round key. Twelve rounds of DES can also be recovered in a similar manner. It was shown that it is possible to solve, in practice, very large systems of multivariate equations with more than 1,000 unknowns derived from a contemporary block cipher such as DES.

BRIEF SUMMARY OF EMBODIMENTS OF THE INVENTION

The present invention provides a method for a data encryption device to perform network communications, the method comprising obtaining an indexed array of encryption keys, wherein the indexed array of encryption keys is shared with a data decryption device; obtaining a message to be encrypted; using a first random or pseudorandom number to determine an index; obtaining a first key from the array of encryption keys, wherein the first key corresponds to the index; selecting a second key from the plurality of encryption keys; encrypting the message using the first key and a second random or pseudorandom number; encrypting the index using the second key and a third random or pseudorandom number; transmitting the encrypted message and the encrypted index to the data decryption device.

Examples of the present invention hide data in chaos-like binary bit streams and operate at the bit level. The traditional fixed-field packet structure, that is ordinarily vulnerable to cyber attacks, is, in one example, transformed into an unpredictable and unrecognizable random bit stream structure that allows detection and characterization of various cyber attacks. Examples further provide self-protecting capabilities to wireless communication. They also allow building communication systems and networks that are secure, unbreakable, trusted, and protected against intrusions and exploration without traditional key- and packet-structure-related security gaps and disadvantages. Moreover, coupled with new cyber attack detecting and classifying technologies, they provide new unique features, such as self-protection. FIG. 1 is a diagram illustrating a comparison of an example wireless communication system implementing secure communication encryption at the bit level in accordance with embodiments described herein (right) as compared to conventional approaches for data encryption (left). in a wireless sensor network (WSN).

According to an embodiment of the invention, method for a data encryption device to perforin network communications comprises obtaining an indexed array of encryption keys, wherein the indexed array of encryption keys is shared with a data decryption device; obtaining a message to be encrypted; using a first random or pseudorandom number to determine an index; obtaining a first key from the array of encryption keys, wherein the first key corresponds to the index; selecting a second key from the plurality of encryption keys; encrypting the message using the first key and a second random or pseudorandom number; encrypting the index using the second key and a third random or pseudorandom number; transmitting the encrypted message and the encrypted index to the data decryption device.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF EMBODIMENTS OF THE INVENTION

Before describing the invention in detail, it is useful to describe an example environment with which the invention can be implemented. One such example environment is that of a packetized data stream communicated over a wireless communication network. A typical data packet includes a header portion, a data portion (sometimes referred to as the payload), and can also include a trailer. The header typically contains housekeeping information such as routing information, synchronization symbols, data length information and so on. The data portion contains the actual data to be transmitted, and the data can be broken up into multiple blocks to fit into a plurality of packets.

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

The various embodiments of the invention, coding systems and methods are provided where a encoding transmitter and a de-coding receiver share a copy of the key table comprising a plurality of encryption keys. A single transmitted message may be encoded using a plurality of keys from this key table, where the plurality of keys is determined according to a particular key sequence. The receiver may be configured to calculate this key sequence independently of the transmitter, or may be provided with the key sequence by the transmitter or through some other method, and can use this key sequence to decode the received echoed message using its own copy of the key table.

Figure 1:
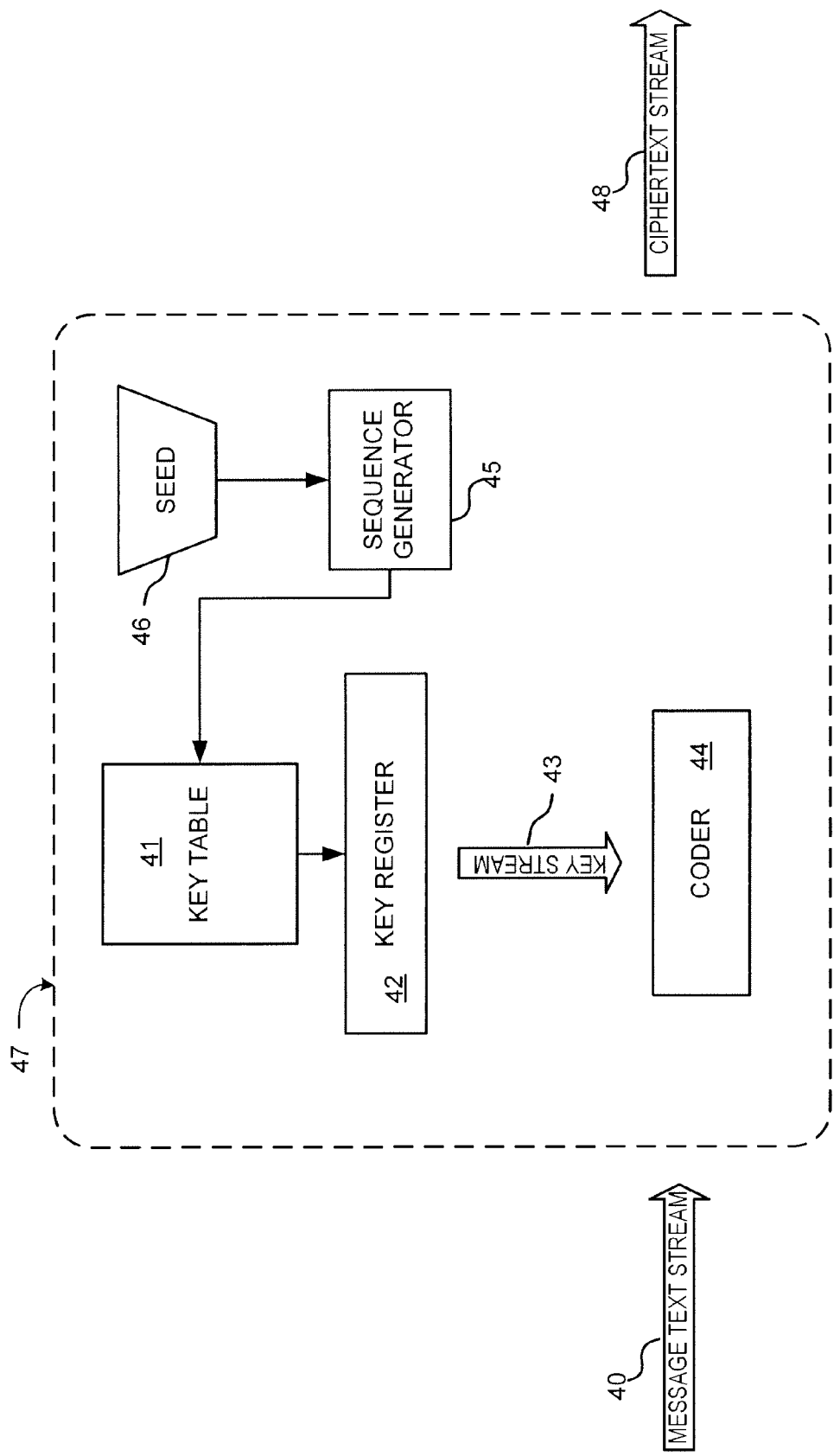
FIG. 1 is a coding module implemented in accordance with an embodiment of the invention.

FIG. 1 illustrates a coding module implemented in accordance with an embodiment of the invention. In the illustrated embodiment, coding module 47 comprises a key table 41 and is configured to provide a plurality of keys in a predetermined or randomly determined sequence to a coder 44 for use in encoding a method text string 40 into a ciphertext stream 48. This key table 41 is shared by a decoding module at a receiver, such that messages enrcypted using keys from key table 41 may be decrypted at a receiver using the corresponding copy of key table 41. In the illustrated embodiment, key table 41 comprises a plurality of encryption keys that are configured to be used in encryption according to a predetermined cipher method.

As a message text string 40 enters the coding module 47, a particular key of the key table 41 is loaded into a key register 42 and used as the encryption key 43 used to encode the message text string. In some embodiments, the message text string 40 may be longer than a single key from the key table 41 is able to encode. In these embodiments, the coder 44 generates subsequent keys from the key table 41 by using a sequence generator 45 to receive a sequence of keys 41 that are sequentially loaded into the key register 42 for encoding long message text streams 40. In some embodiments, the keys of the key table 41 are indexed and the sequence generator 45 is used to determine the sequence of indices for the key sequence used to encode the message text 40. These key sequences may be used to generate multiple keys for encrypting one message, or a plurality of messages. For example, in a packet based communication method, as described below, single keys may be used for each packet, and the key sequence may be used to determine the subsequent keys for subsequent packets. In various embodiments, the coder 44 may use various encryption ciphers to encode the message text string 40. For example, in addition to the ciphers described below, symmetric key ciphers, such as AES, DES, triple DES, or Blowfish might be used in message coding using key tables as described herein.

In some embodiments, the sequence generator 45 may be a pseudorandom number sequence generator and may be provided with an initial seed 46 used to generate the initial key of the key table and to generate the subsequent pseudorandom sequence of key indices. In these embodiments, a receiving device may be provided with a equivalent sequence generator and may provoke be provided with the same initial seed used by the coding module 47, so that when the receiver decodes the ciphertext stream 48, the receiver is able to derive the same key sequence used in encoding the message 40. In other embodiments, the sequence generator 45 is not provided to the receiving module, and information required to derive the key sequence is provided to the receiver in other manners. In one embodiment, the receiver and transmitter may share a initial key indices, and subsequent key indices may be encoded along with subsequent blocks of message text. For example, the first ciphertext block may be encoded with the indices of the key used to encode the second message text block, and so on. Accordingly, the receiver is able to decode the first block of ciphertext using the shared initial embassy, and is able to decode the subsequent ciphertext blocks using the next key index received from the presently decoded message text block. In other embodiments, the different methods of providing the key sequence to the receiver may be employed, for example, the key sequence may be sent on a separate physical channel using different communications methods. In some embodiments where the receiver is not required to independently calculate the key sequence, sequence generator 45 might comprise a random number generator, for example a noisy diodes random number generator or a random number generator using beta particle decay.

Figure 2:
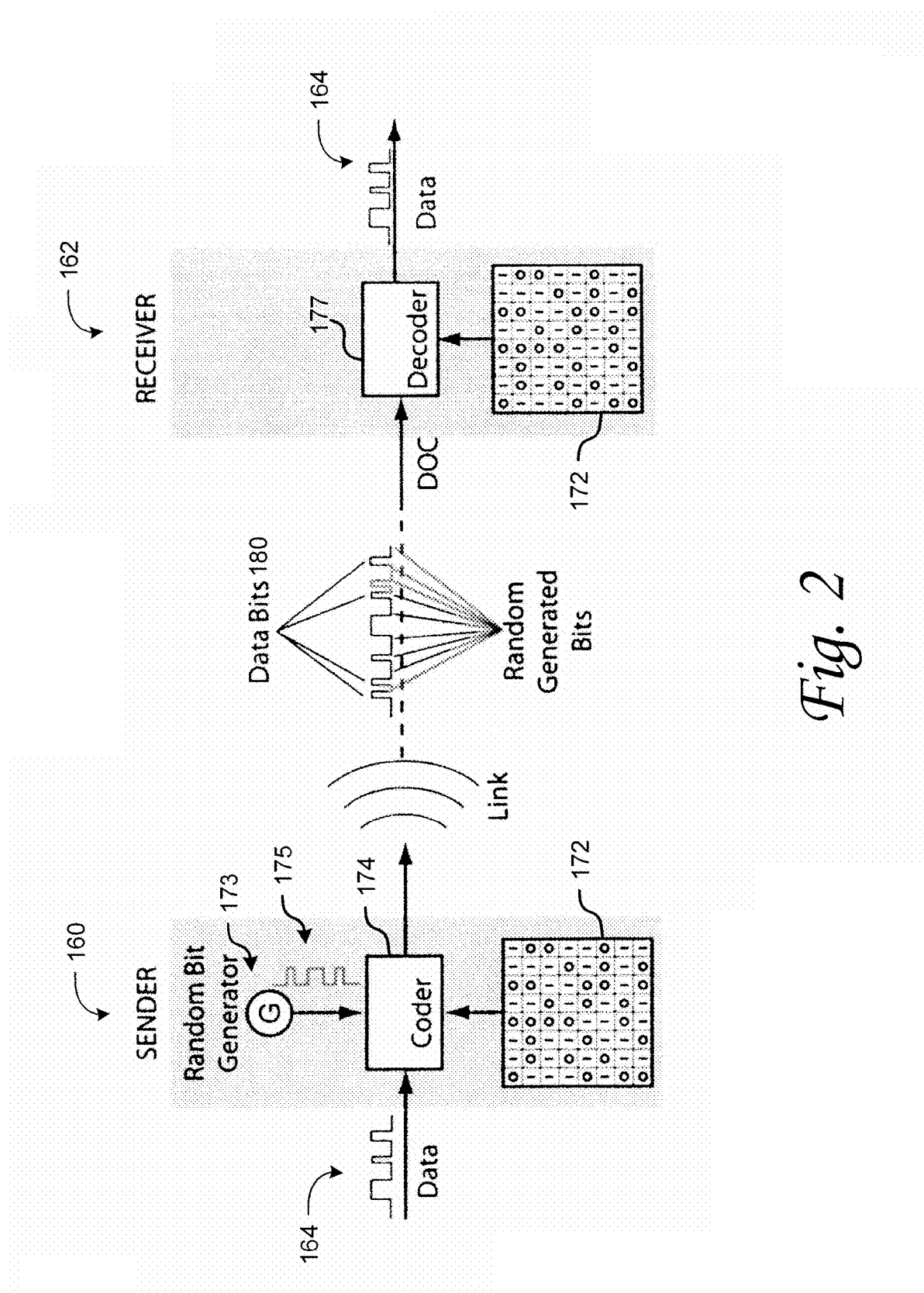
FIG. 2 is a diagram illustrating an example coding device that combines a device key array with random bits generated by a random or pseudorandom bit generator to generate the ciphertext output in accordance with one embodiment of the invention.

One embodiment of the systems and methods described herein randomly distributes data bits through a binary bit stream. For example, extra bits can be inserted into the bitstream in a random fashion as one part of securing the plaintext data stream. Examples of this bit-inserting methodology may utilize a bit-inserting algorithm that operates as now described. FIG. 2 is a diagram illustrating an example coding device that combines a device key array with random bits generated by a random or pseudorandom bit generator to generate the ciphertext output in accordance with one embodiment of the invention. For example, a random bit generator may be built using true random sources such as noisy diodes (Zener diode, which uses noise voltage at the diode's terminals), radioactive decay, or other natural sources of randomness, such as those based on probing the chaotic and unpredictable fluctuations in a nematic liquid crystal, or a random bit generator may be built using a pseudorandom source such as a deterministic number generator developed according to NIST SP 800-90, Recommendation for Random Number Generation Using Deterministic Random Bit Generators (DRBGs. As illustrated, this example includes a transmitting module 160 and a receive module 162. The sender 160 includes a device key array 172 and a random or pseudorandom data generator 173 that feed into a coding module 174. Coder 174 combines the device key array 172 with random bits 175 generated by a random or pseudorandom bit generator 173 to generate the ciphertext output 180. The key array 172 can be a table or other data structure with randomly generated or pseudorandom bit sequences. In one embodiment, the coding module 174 inserts random-length groups of randomly generated bits (0's or 1's) between bits of the input data 171, using one or more randomly selected lines of the device key array, or "fingerprint," information in the algorithm for this data transformation. The mixed chaos-like binary information is then transmitted to the recipient 162.

In some embodiments, the length of each group of randomly generated and inserted bits is also random, so that the data from the chaos-like bit stream 180 cannot be retrieved, and the data structure cannot even be recognized (for example, locations of the bits or bytes of data). This example algorithm mixes two or more random processes with data. Because three (or more in other examples) objects of the same nature are mixed, not even one of them can be recognized without the device key array 172. Therefore, the same device key array 171 at the receiver site 162 can be used by decoder 177 to reassemble the ciphertext data 180 into its original plaintext form 164. In some embodiments, the same key array can be used as many times as desired for data encoding.

A device key array may be implemented as a table that comprises several byte-sized units of binary information that may be organized into a key array and located in the encrypting/decrypting (or sending/receiving) device's memory. The units are preferably randomly generated to better ensure data security. By operating at a bit level, these examples can provide higher security than traditional methods that operate at text level. In such examples, data and even data structures cannot be retrieved without knowing a unique device key array.

Figure 3:
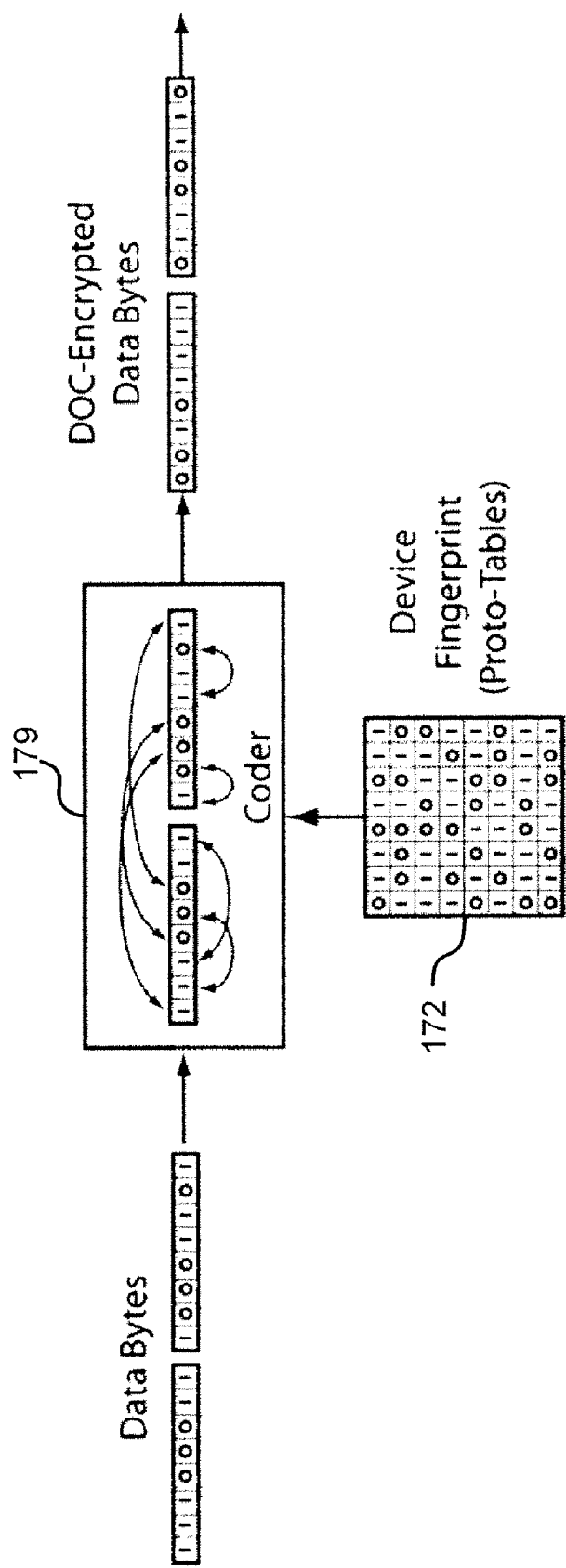
FIG. 3 is a diagram illustrating an example coder using a bit-swapping algorithm in accordance with one embodiment of the invention.

FIG. 3 is a diagram illustrating an example coder using a bit-swapping algorithm in accordance with one embodiment of the invention. This example may avoid inserting the extra information used to hide the data as described above with the bit-inserting example. In such embodiments, the coding module 179 can be implemented such that data bits of an input data stream 164 may be randomly swapped within data bytes or even between bytes of the cleartext data. This process can be analogized to shuffling playing cards before a game starts. Some systems implementing the bit-swapping algorithm may use the same device key array 172 to control the bit swapping as that described above with reference to the bit-inserting algorithm. This key array 172 can be used to drive the bit-swapping algorithm, and thus, be used at the receive end to decipher the data.

Figure 4:
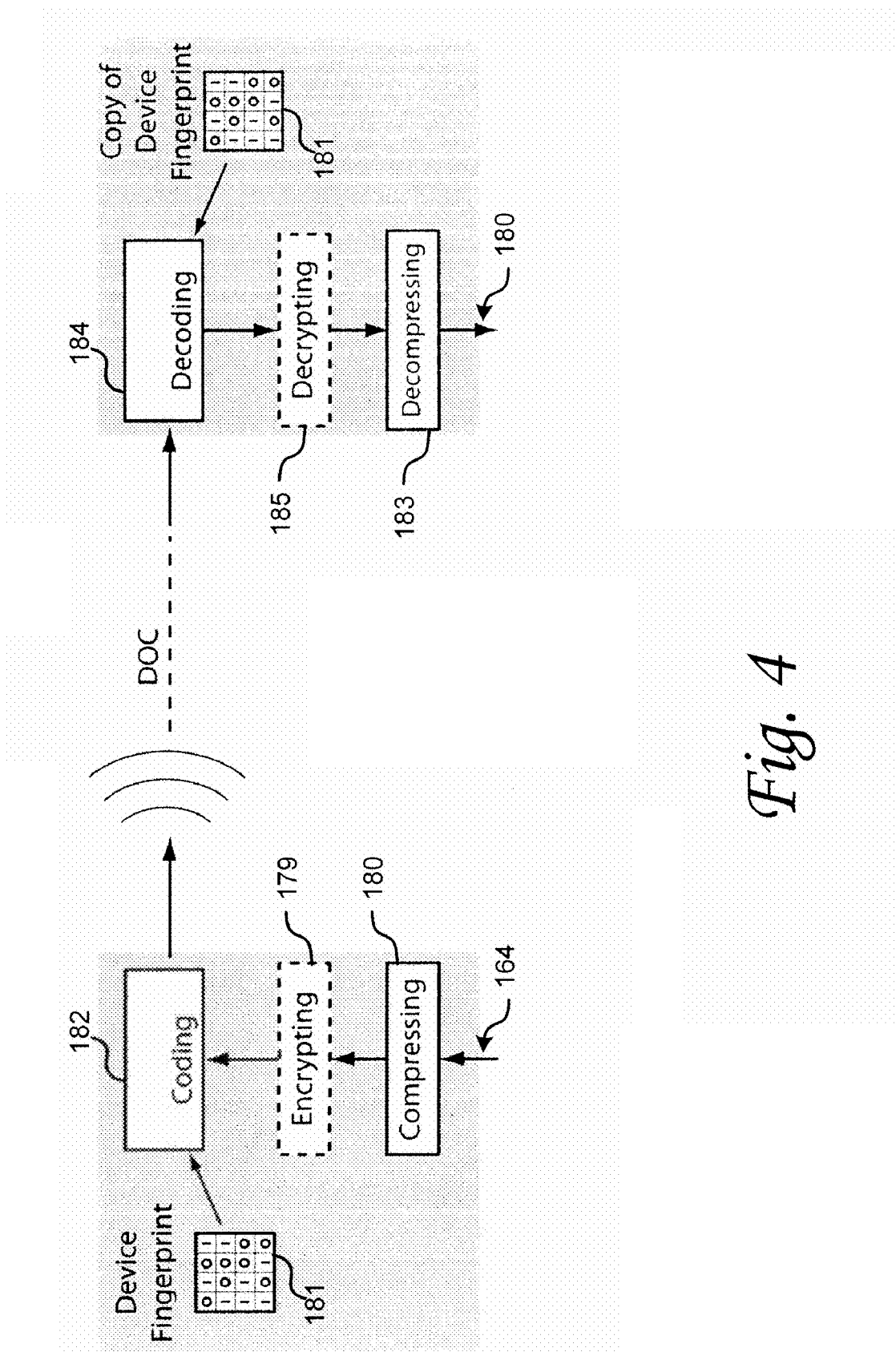
FIG. 4 is a diagram illustrating an example of using conventional encryption techniques with a device key array in accordance with one embodiment of the invention.

In examples employing either algorithm, or both algorithms, encrypted data and even data structures cannot be retrieved without the device key array 172. This lends a measure of security to communication or/and data storage operations. To further increase security, data may be compressed and/or encrypted using existing technologies before the exemplary encryption. However, in some examples any additional encryption may be foregone. FIG. 4 is a diagram illustrating an example of using conventional encryption techniques with a device key array in accordance with one embodiment of the invention. Referring now to FIG. 4, as can be seen in this example an encoder 182 and device key array 181 can be used to encode data, for example, as described above with reference to FIGS. 2 and 3. In addition, input data 164 can be encrypted using, for example, conventional encryption techniques 179. Conventional encryption techniques 179 are well known to those of ordinary skill in the art. In addition, compression algorithms can be used to compress incoming data 164. At the receiver, the device key array 181 can be used by a decoder 184 to decode the data and decryption and decompression algorithms 183, 185 can be used to recover the data.

Various methods of key management may be employed in different embodiments. These key management methods may comprise various protocols or rules for key table updates, key table maintenance procedures, or key table distributions. In some examples, use of device fingerprints or key arrays enables implementation of an anti-tamper technology. Some examples may utilize an encrypted key array. The key array, encrypted or otherwise, may be distributed through the device hardware or software. Further examples may be configured to decrypt only one needed key of the key array at a time. Further examples may include the ability to render the implementing device useless by erasing the key array. In additional embodiments, key arrays may not be complete when first shared. For example, a first proto-key array may accompany a first device and a second proto-key array may accompany a second device and proper biometric patterns input from users of the first and second device are required to generate the key array from the first and second proto-key array. As another example, the recipient's device may be provided with an incomplete key array and may require input GPS coordinates corresponding to the sender's location in order to generate a shared key array. Other arbitrary information may be used for these purposes, for example telemetry data or environmental data such as a local temperature. In further embodiments, additional security levels may be obtained by utilizing data sources that are known to each party but do not need to be transmitted in various methods and subroutines described above. For example, before system deployment the receiving party any transmitting parties may agree on a shared data source that will be used in various predetermined components or methods. For example, the parties may agree to update a key sequence initialization data and a predetermined period using an agreed data source comprising the temperature of a predetermined location at the predetermined update time. In some embodiments, it may be difficult to use such sources of shared information to determine sufficient extra data for increased security. In such embodiments, various methods may be used to extend the useful amount of data provided by such a shared information source. For example, in the predetermined temperature example 8 bits of data may reasonably be obtained from the temperature of a single location and a predetermined update time. However, this amount of shared information may be extended by using the initial shared information in a further shared method of the data extension. For example, the eight bits of data may be used as a seed for an eighth order pseudorandom number generator. This eighth order pseudorandom number generator may be configured to provide all $2^8$ possible eight bit numbers in an order in a pseudorandom order that is determined by the initial seed. Accordingly, the initial temperature seed may be used to generate a 256 bit (32 byte) number that may be used in encoding and decoding methods as described herein. In this temperature example, the 256 bit number may be used as an initial number for a key table, thereby avoiding transmitting the initial key index to the receiving device.

In some embodiments, key tables are distributed to various communicating parties using trusted couriers. Furthermore, methods of securing the key tables while in possession of the trusted couriers may be implemented. In a particular embodiment, key tables are distributed using anti-tamper and tamper evident devices, for example of the type described in U.S. Pat. No. 7,556,532, issued on Jul. 7, 2009, which is hereby incorporated by reference.

In other embodiments, key tables may be distributed over a network communications medium, such as the same network used for the security communications described herein. In such embodiments, the key tables may be secured through additional security methods. In some embodiments, transmitters and receivers could be provided with a master key table, for example using a trusted courier or during manufacture, and this master key table could be used to generate tables for communication session keys for use in particular communications sessions. For example, a plurality of master keys in the master key table could be used in encrypted key exchange methods to generate a session specific shared key table. In further embodiments, the shared key table may be derived from other information provided to the transmitter and the receiver. For example, a shared array of large prime numbers might be provided to the transmitter and receiver, which can then use these numbers to derive a shared key table, such as through a simple password exponential key exchange protocol.

In still further embodiments, other methods of key distribution might be employed, such as asymmetric key distribution methods. For example, in a particular embodiment the key tables are encrypted using a public key encryption algorithm, wherein the key table receiver is provided with a private key that it can use to recover the transmitted key table. As another example, the key table may be encrypted using a private key that is shared between the encoding and decoding parties using a quantum cryptographic key distribution system, such as the BB84 protocol. In still further embodiments, combinations of these or other methods may be used for key table distributions. For example, a key table may be divided into various parts, and the parts may be transmitted separately, either over or different physical channels or on the same physical channel using different methods. For example, a trusted courier may deliver a first portion of a key table, while public key encryption may be used to deliver the second portion of the key table.

In these embodiments, key table maintenance procedures might comprise storing the key table during a agreed-upon key table lifetime according to a predetermined protocol or rule. For example, the key table may be stored on a computer security card that is removable from the decoding and encoding devices. In this example methods or procedures may be employed in the decoding and encoding devices to ensure that the key table is not stored in any form of memory after the computer security card is removed. Accordingly, in such embodiments the key table is secured from physical acquisition so long as the computer security card is maintained in a physically secure manner.

In still further embodiments, power used for device operation may reduced or minimized maintain the same key table for a device lifetime, or for an extended period. In a particular embodiment, such as described with respect to FIG. 10, the encrypting and decrypting transceivers may comprise sensors within a wireless sensor network. For example, in some environments, these sensors may be self-powered and deployed in a non-accessible manner such that operating lifetime is a priority. In such embodiments, each sensor node may be equipped with a key table that is used for the device's lifetime. Accordingly, the sensor life may be extended because the sensor is not required to expend power for the computations required to derive session specific keys.

Instead of generating and distributing a traditional key, some examples may use random processes for encrypting the data at the bit level, keeping only the fingerprint or key array in memory. Exemplary key arrays may describe several random algorithms that determine how a random process will encrypt the data. Thus, in some embodiments keys are not necessary, and the task of key generating and distributing and key-related security issues can be eliminated in some embodiments.

Each key of a key array may describe or reflect one random algorithm of data encryption using a random process. Accordingly, multiple lines can describe multiple different random algorithms for data encryption. To encrypt a data packet, a key of a key array (i.e., an algorithm) may be randomly selected, thus adding another random process. Furthermore, in some key arrays, the key length of the keys of the key array may be reduced by increasing the number of keys in the key tables. Accordingly, in these embodiments two-dimensional key table space may be saved by increasing one-dimensional indexing space or one dimensional key length space. In examples where the key array lines are randomly selected, one key array can be used as many times as necessary, and may remain small. For example, a 100-byte key array can be created that provides security that at least exceeds security requirements of Cryptographic Modules (FIPS 140-2, 140-3) by a factor of 268. Moreover, each bit of randomly generated information located in the key array may be used several times during the same encrypting process. This allows further reduction in the key array size without a security penalty.

In some embodiments, the key tables may be updated or modified as communications progress. In one embodiment, a method for updating the key table comprises adding a key's index to the key each time the key is used. In this embodiment, this process is performed by the transmitter and receiver such that key table symmetry is maintained. In other embodiments, other such methods may be employed. For example, in one embodiment, a single indexed key is used for each packet in a packet based communications system. In this embodiment, the key used for the packet may be updated by various modifications after the encryption process. This might comprise adding the MAC or random nonce used in the packet to the key after encryption (and decryption, for symmetry). In other cases, this might comprise using these pieces of data for various permutation operations. For example, the MAC or random nonce might be used for permuting keys within the key table, or might be used for permuting the key used for the message containing the MAC or random nonce. In other embodiments, similar processes might be used for updating the entire key table. For example, a specific cipher text or predetermined portion of a specific cipher text might be added to each key of a key table to generate a new updated key table. In a particular embodiment, this method of generating an updated key table might be employed if key table distribution process in unavailable. For example, a specific system deployment might be configured such that if a key distribution process is not initiated at a pre-specified time, then the system utilizes a cipher text sent after a predetermined number of messages or at a second pre-specified time to update the key table.

Figure 5B:
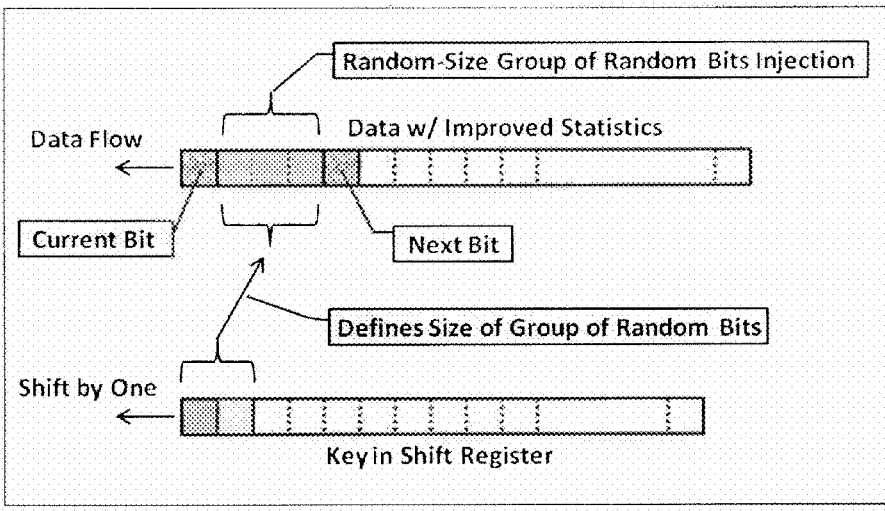
FIGS. 5A and 5B illustrate a simplified example bit-inserting encrypting algorithm in accordance with one embodiment of the invention.
Figure 5A:
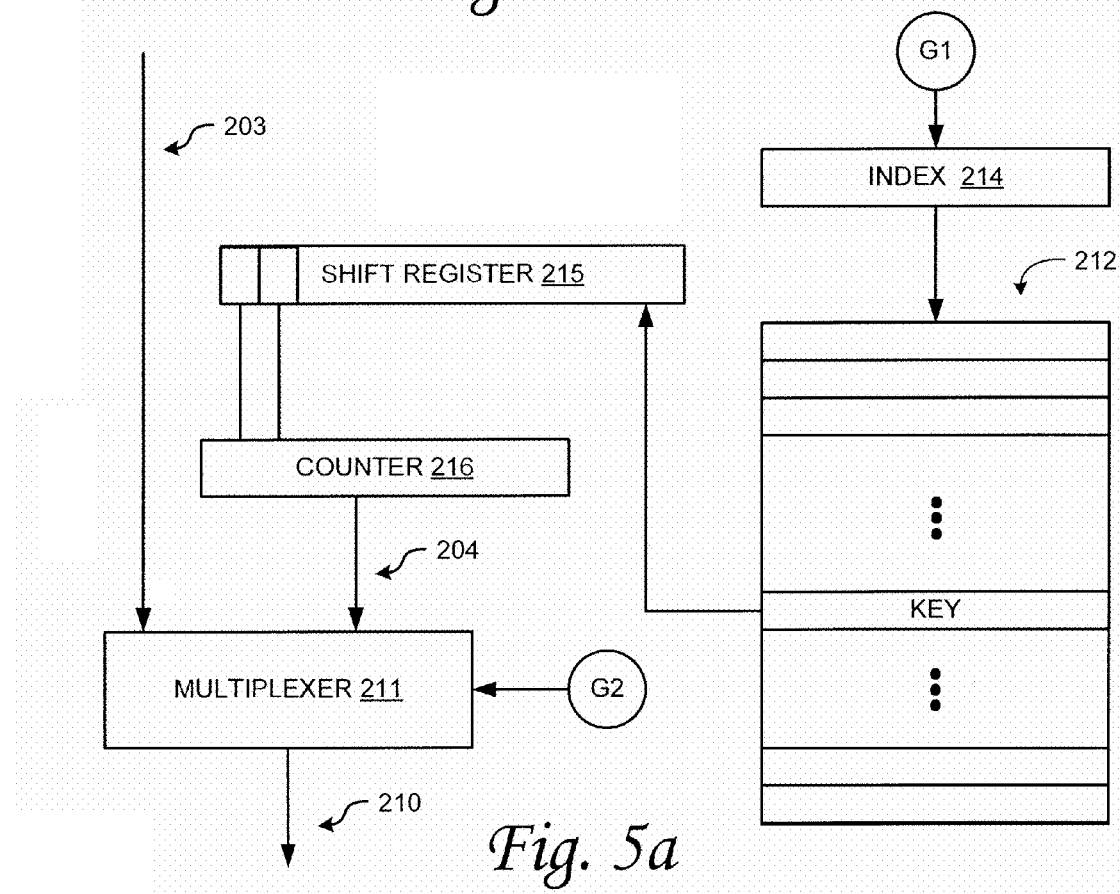

FIGS. 5A and 5B illustrate a simplified example bit-inserting encrypting algorithm in accordance with one embodiment of the invention. In this example, three random processes are mixed with incoming data. Ideally, the random processes are truly random processes, although pseudorandom processes can be used. A multiplexer 211 or the like is provided to combine the plaintext data bits 203 with the randomly generated data bits 204 to create an encrypted bit stream 210. In one embodiment, the multiplexer 211 is a true multiplexer that simply multiplexes individual input streams into a combined output. Accordingly, the input data stream is still present in the encrypted output in its original order, but there are other data bits inserted in the data stream so that the input data stream is not in consecutive order.

The random data generator G2 generates random bits (0's and 1's for binary data streams), that are input to one input of the multiplexer 211. The random generator G1 generates random numbers to form an index 214 referring to an indexed key of the key array stored on the memory 212. In one embodiment, the random number generator G1 generates binary numbers from 1 to N, where N is the index of the last key of the key array. Accordingly, random generator G1 randomly selects the first key of the key array that is used in the encryption process.

Figure 6:
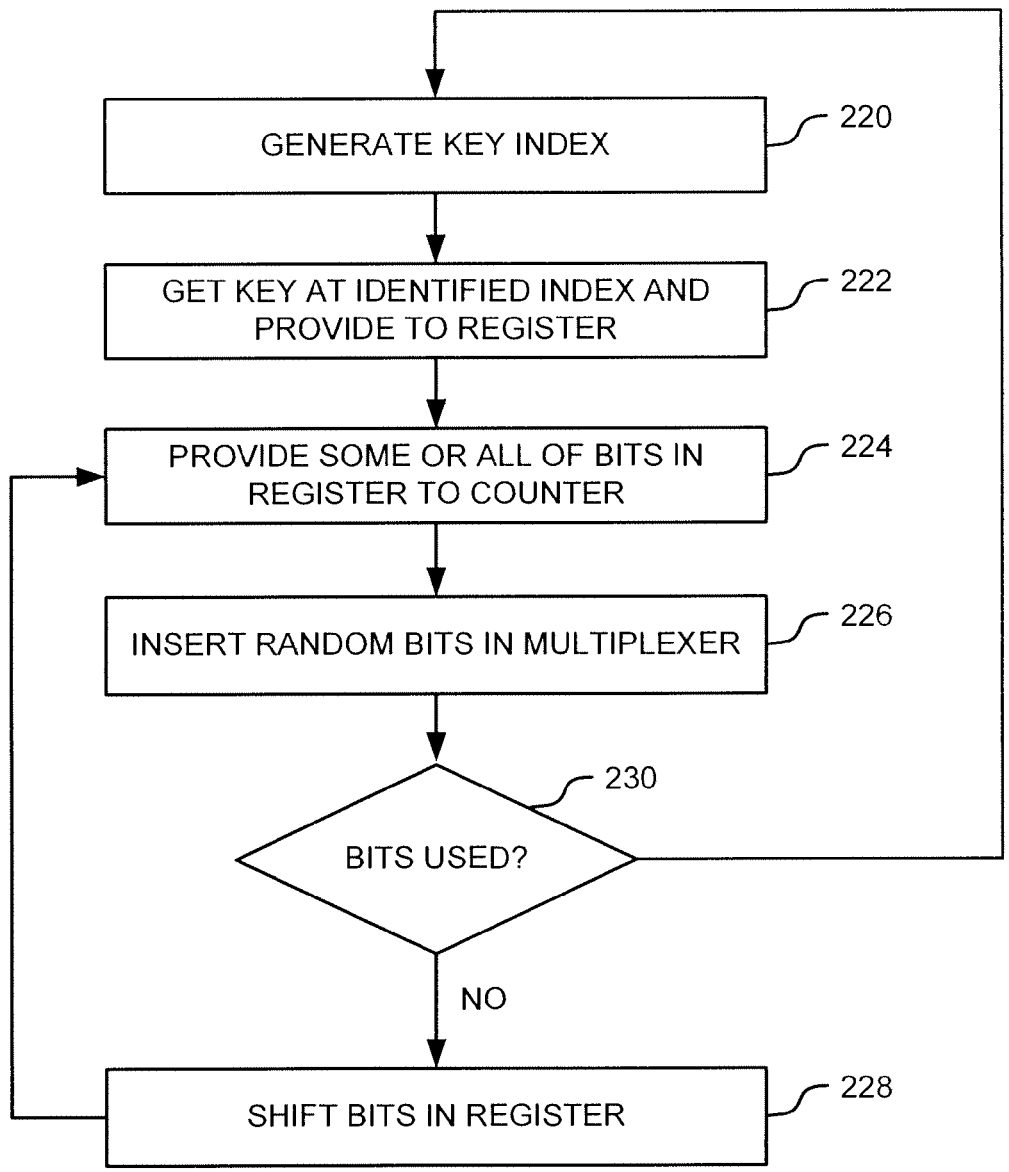
FIG. 6 is a diagram illustrating an example process of the cipher in accordance with one embodiment of the invention.

FIG. 6 is a diagram illustrating an example process of the cipher in accordance with one embodiment of the invention. Referring now to FIG. 6, in a step 220 when an encryption process starts, the random number generator G1 generates a random number SKI (Start Key index) 214, and this key index is saved in the key index register. Then, in step 222 the key with the index pointed to by the index 214 is copied to the shift register 215. Bear in mind that the key array in one embodiment can be previously randomly filled with 0's and 1's, further randomizing the process. Then, in step 224 some or all of the bits of the shift register 215 are copied into the counter 216. In one embodiment, the two or three most significant bits are copied into the counter 216.

In step 226, the counter 216 controls operation of the multiplexer 211, to control the insertion of bits generated by G2 into the data stream between the input data bits 203. For example, if the counter contents are equal to zero, then no random bits will be inserted, and the current data bit is moved to the output without a modification. If the counter contains some number that is not equal to zero, then that number of random bits (generated by G2) will be inserted between a current data bit and the next data bit. In one embodiment, after this bit insertion, the counter is decremented by 1, and the process repeats until it reaches zero. In step 228, when the group of random bits is inserted, the data in the shift register 215 is shifted and a new value is copied from the shift register 215 into the counter 216. The process can check to see whether all of the bits loaded into register 215 have been used before shifting and, if so, a new index can be selected. This is illustrated at 230. The output of the counter defines whether a data bit or a random bit will be forwarded to the output of multiplexer. In some embodiments, the new index selected after the previous key has been exhausted is determined according to a deterministic process, such as a pseudorandom deterministic process using the previous key as a seed. Accordingly, in these embodiments, the decrypting unit may be equipped with the deterministic process and a copy of the device key array, so that only the starting key index needs to be delivered in order to allow decryption. This process should be repeated until all the data is encrypted.

Figure 7B:
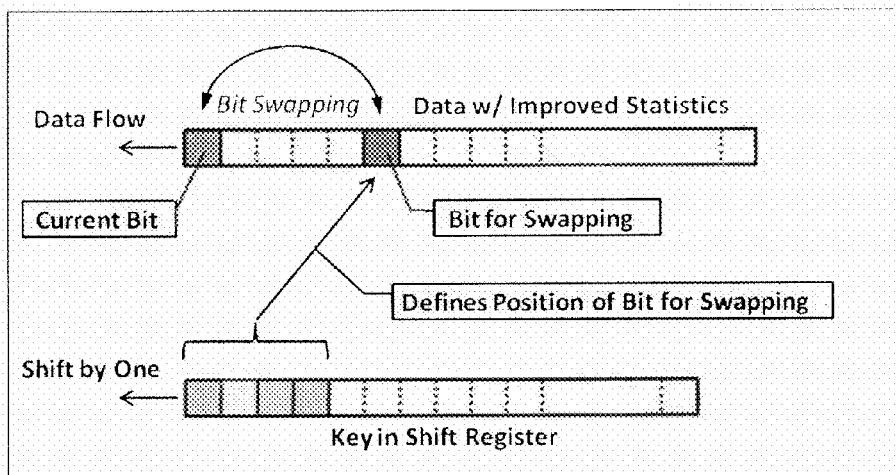
FIGS. 7A and 7B illustrate an example simplified bit-swapping encrypting algorithm in accordance with one embodiment of the invention.
Figure 7A:
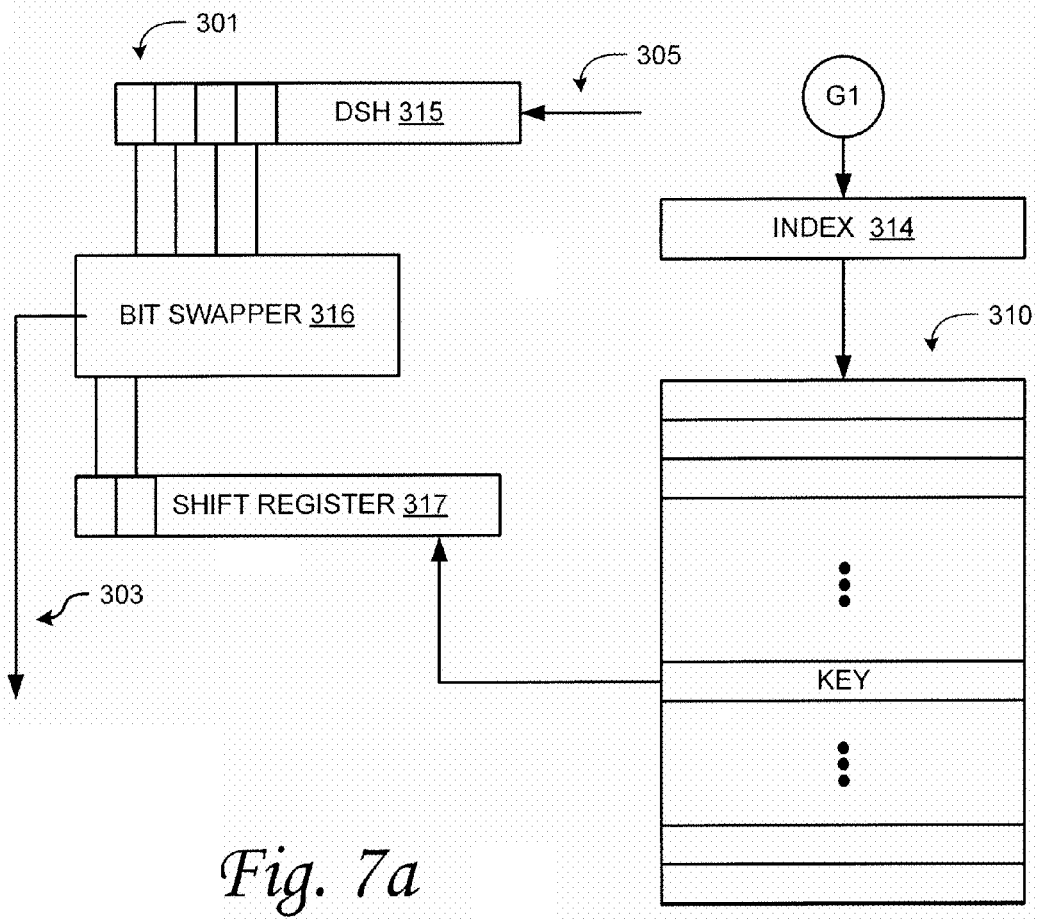
Figure 8:
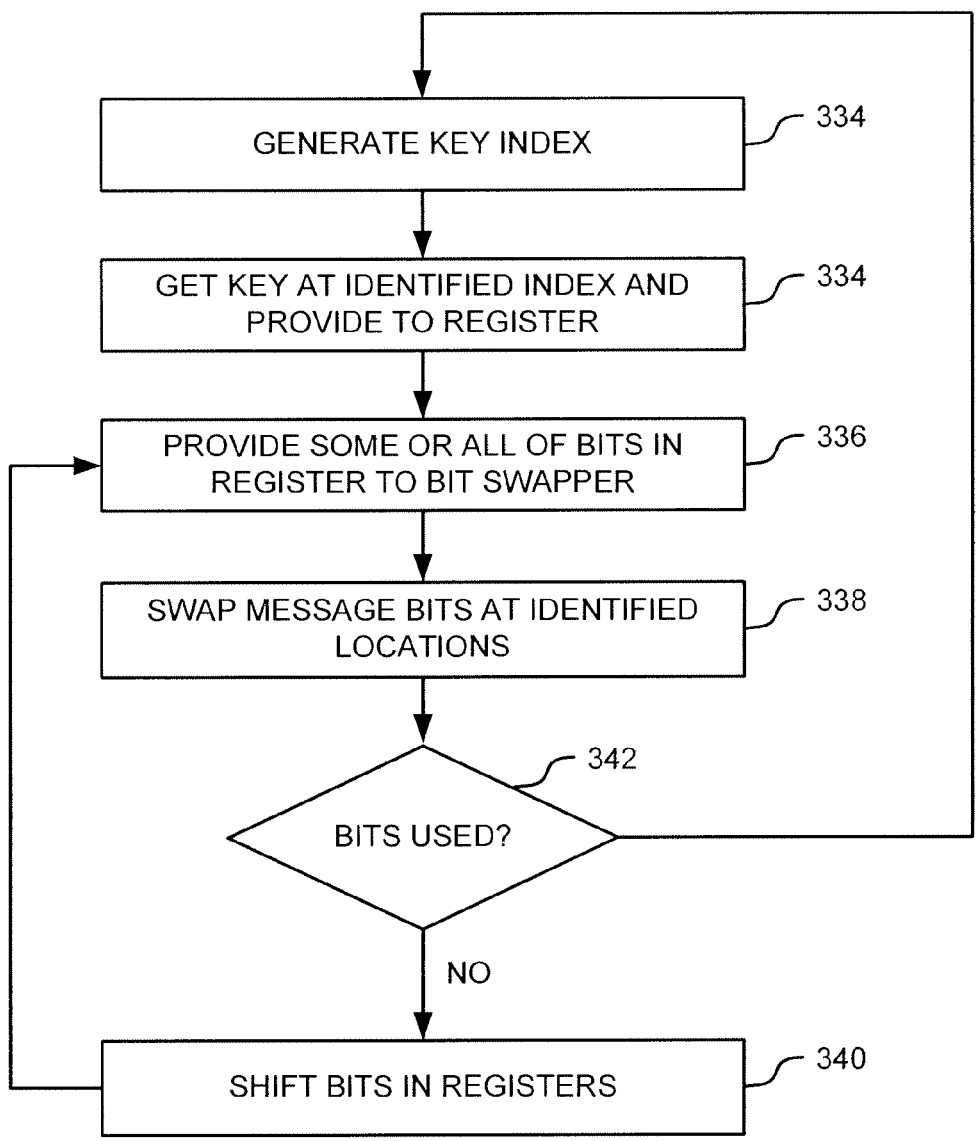
FIG. 8 is a diagram illustrating an example process of the cipher in accordance with one embodiment of the invention

FIGS. 7A and 7B illustrate an example simplified bit-swapping encrypting algorithm in accordance with one embodiment of the invention. FIG. 8 is a diagram illustrating an example process of the cipher in accordance with one embodiment of the invention. Referring now to FIGS. 7 and 8, in this example, two true random processes are used to encrypt the data. In this example, the input data bits are shifted through the data shift register 315, and the first bit 301 of data shift register 315 contains the current data bit. As in the previous example, in operation 332, before an encoding, a random key index 314 is generated by random data generator G1. In operation 334, a corresponding random key of random key array data is copied into a shift register 317. In this embodiment, in operation 336, a subset of some or all of the bits in the shift register 317 is used to control the bit swapper 316. This is the two most significant bits in the illustrated example. However, the difference between this example and that of FIG. 5 is that the number contained in the most significant bits of the shift register 317 defines the number (or position) of the data bit which will be swapped with current data bit. Both shift registers are shifted by one bit after each bit-swapping cycle. This is illustrated by operations 338 and 340. The process can check to see whether all of the bits loaded into register 317 have been used before shifting and, if so, a new key index can be selected as shown at 342. This process should be repeated until all data is encrypted.

Wireless sensor networks (WSNs) and other communication channels may benefit from features of certain example embodiments. Such features can include: transforming standard data packets into unpredictable random bit-streams; performing highly secure data packet encryption in a data flow; reducing computing and communication overhead and cost; eliminating the expense of generating and distributing secret shared keys and avoiding key-related security issues; providing unique tools for evaluating device trust level; and detecting and classifying basic types electronic attacks at the device level.

Figure 9:
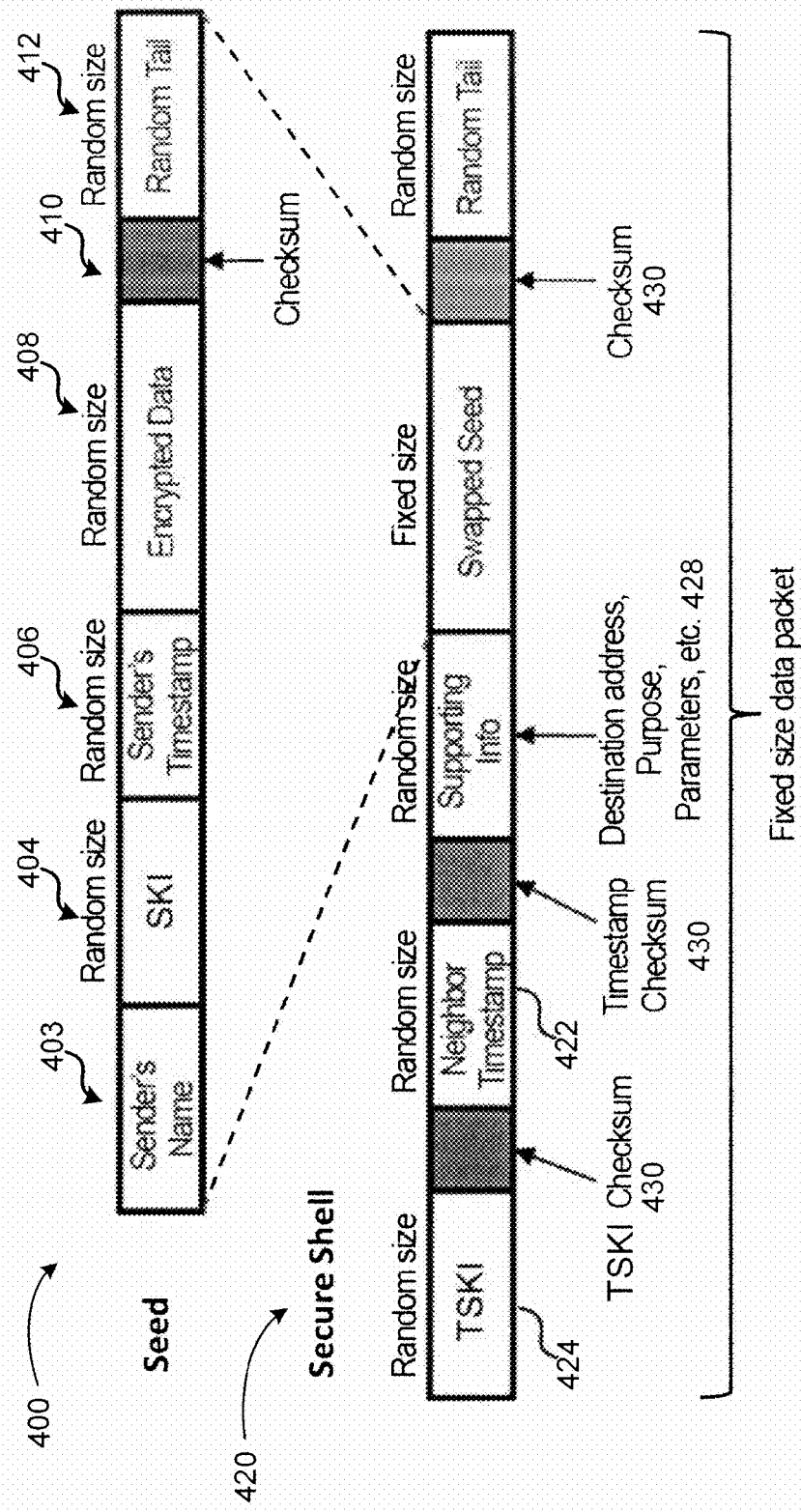
FIG. 9 illustrates an example ciphertext in accordance with one embodiment of the invention.

FIG. 9 illustrates an example ciphertext in accordance with one embodiment of the invention. In the example illustrated in FIG. 9, the original data portion of the data packet is replaced with the seed 400, which is modified to include the sender's name 403; a random start key index (SKI) 404, which references to a key of a key array, or other key array pointer; a random sized timestamp 406; the encrypted data 408; a checksum 410; and a random tail 412. In this example, the added items can, but need not be, of random size to help obscure the data. The randomization can be accomplished for example, using key arrays or like fingerprints. Swapping the original data with this seed 400 can provide added security measures. For example, inserting a checksum, an encrypted timestamp, and an encrypted random number start key index (which references to a key of the key array) into the header of a data packet allows reliable and secure node validation and detection and classification of an electronic attack at the device level. Examples of electronic attacks include: Denial of Service (DoS), Replay, Spoofing, and Message modification. This insertion can be used to help the system evaluate a device trust level. In this example, each data packet starts with a random-length, randomly encrypted (using the first or other selected key of the key array or element of a fingerprint) random number, has random-length randomly encrypted fields, and ends with a random length "tail"—a set of randomly generated bits which are used to make the packet a fixed size. This process makes the packet appear in the space (or on the line) as an unrecognizable random bit stream.

In the illustrated example, the secure shell 420 also has added security features. For example, the header is made of random size to include the desired supporting information. A random length neighbor timestamp 422 is provided as well as a random size tail 426 and Transport-Start-Key-Index (TSKI) 424. Supporting information 428 can also be included for destination address, purpose, parameters or other information, and can be of random size. Checksums 430 can be used as a check for the shell items.

Features of the exemplary packet shown in FIG. 9 enable a security and cyber attack detection. For example, the wrong timestamp indicates a replay or spoofing attack; the same SKI in several packets indicates a replay attack, and so on. The illustrated example packet structure includes a data "seed" 400 that has been randomly encrypted using a device fingerprint (for example, a key array). It also includes a secure shell 420 with embedded security tools that are used to: securely deliver the encrypted seed; validate the sender; and detect and classify possible cyber attacks. In other examples, the shell 420 can be encrypted using a transport key array rather than the seed key array. This transport key array may be encrypted using the device key array, and could be securely and wirelessly sent and dynamically changed if necessary. This avoids sending the device key array through wire or air in any form. Because the key array is not sent, invalid devices do not have a chance to gain access to the system, so the communication cannot be cracked.

Some examples may enable bidirectional device authentication and trust without traditional bidirectional authentication algorithms by transforming traditional fixed-field packets into an unpredictable random bit streams. These examples may also provide reliable tools and mechanisms to detect and classify different kinds of electronic attacks and protect against those attacks. Some examples may employ a receiver station and a sending device. A receiver station that has a copy of a sending device's key array is able to recognize: which sending device an information packet belongs to; if it is a valid device; and what the data is, because all this information is hidden in the data packet structure and contents. The receiving station may recognize this information even without knowing a sender's address. For example, this identification can be achieved by simultaneously decrypting the packet header using copies of the different devices' key arrays. The sending device is the first device whose key array enables checksum matching. This method works equally well in a backward direction.

As the example in FIG. 9 illustrates, a data packet may appear to be an unpredictable random bit stream without fixed-length fields. This data packet structure may provide security and trust benefits and further enable implementation of many additional features. For example, all the information in the packet (except the random tail) may be encrypted with bit-inserting and/or bit-swapping encryption algorithms such as those described herein. Exemplary packets can, but need not, have any fixed-length fields at all. In certain examples, the packet may start with a TSKI random number encrypted according to one or both of the above-described algorithms with its checksum following timestamp and timestamp's checksum. In further examples, the timestamp and timestamp's checksum may also be encrypted as described above. In further embodiments, other security features may be employed. For example, message authentication codes (MACs) may be inserted in locations in messages according to the methods described herein. In some embodiments, the MACs might comprise conventional cipher-based MACs or hash-based MACs such as a MAC based on universal hashing.

In some examples, communication may be asynchronous. Further examples may use timers for security purposes. These timers do not have to be precisely synchronized in the system. However precise timer synchronization may be required by an environment monitoring/measurement task. For security, approximately plus or minus 2 to 5 minutes inconsistence in synchronization between timers of neighboring nodes will provide an acceptable time-trust window and reliable packet validation and guarantee a high level of trust in the system.

Some exemplary systems may be performed on the hardware level in the data flow and do not require any additional processing overhead. Thus, at the beginning of a packet receiving process, the receiver is able to automatically recognize which sending node the packet belongs to, simply by decrypting the packet information simultaneously using several neighbor key arrays and comparing TSKI's and timestamp's checksums. After the first checksum matches, the receiver drops all key arrays except the matching one, thus correctly determining the sender (or predecessor).

In further exemplary systems, the TSKI and timestamp checksums may be followed by encrypted supporting information such as: destination addresses, purpose of packet, and some additional attributes or parameters. A random tail at the end may follow the encrypted data seed and security attributes. This universal packet structure may support large packets. Examples may be compatible with IPv6.

Because of simplicity and security, Embodiments of systems implementing a systems and methods described herein can be implemented to reduce security and authentication overhead, thus reducing required hardware and software. Embodiments of systems and methods described herein can be implemented to ensure that the data encrypted in the random bit stream will be secure, delivered to the right place and at the right time, and protected against exploration, intrusions, and attacks.

Example devices that combine embedded packet structure security tools and described encryption methods can be provided that allow for secure, reliable, architecturally simple, jam-resistant, self-protecting robust networks and links with real-time response to threats, automatic channel switching and dangerous channel avoidance, and no need for human control, with increased convenience, flexibility, efficiency, cost savings, and easy system administration.

Figure 10:
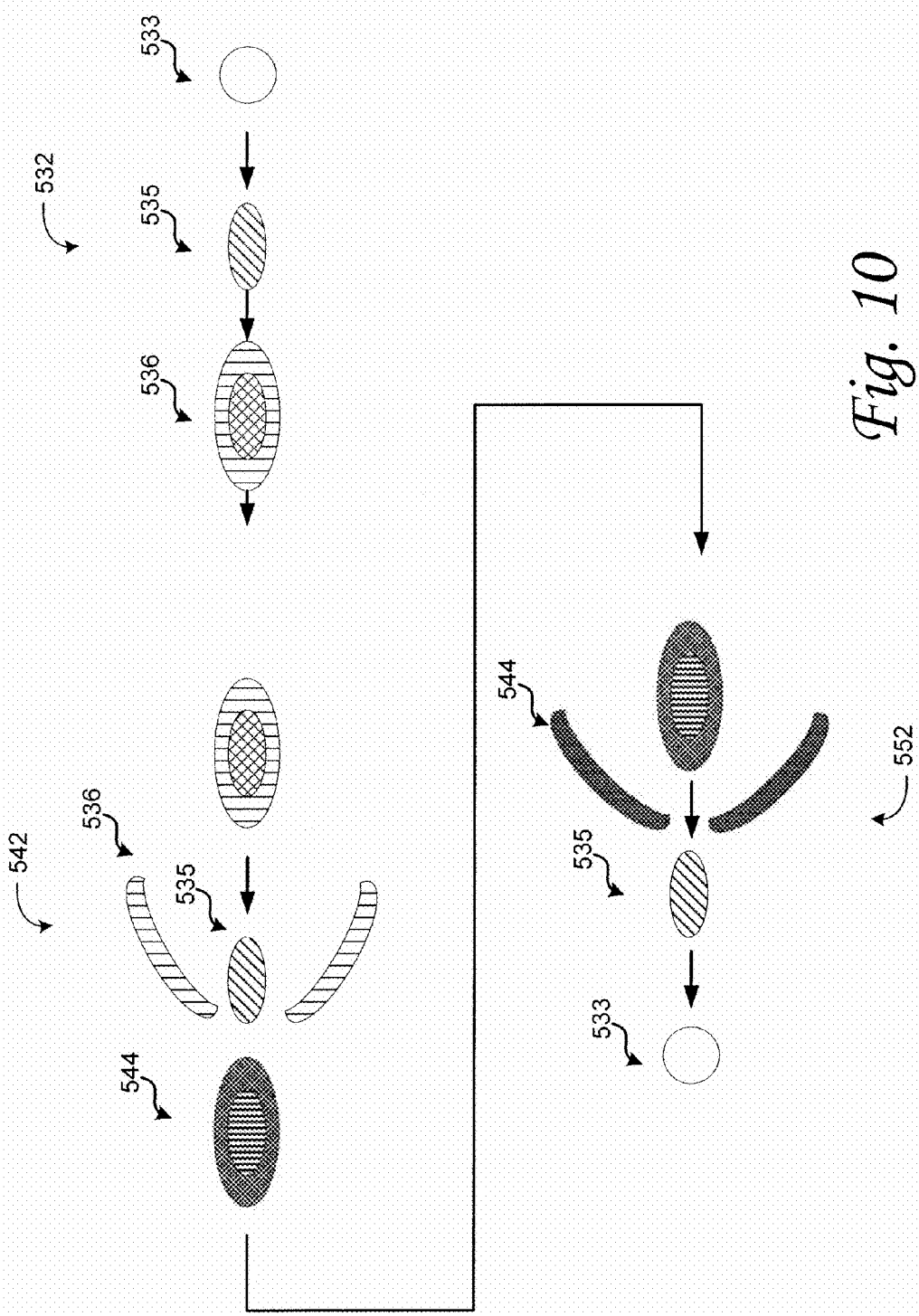
FIG. 10 is a diagram illustrating an example of a secure multi-hop network communication in accordance with one embodiment of the invention.
Figure 11:
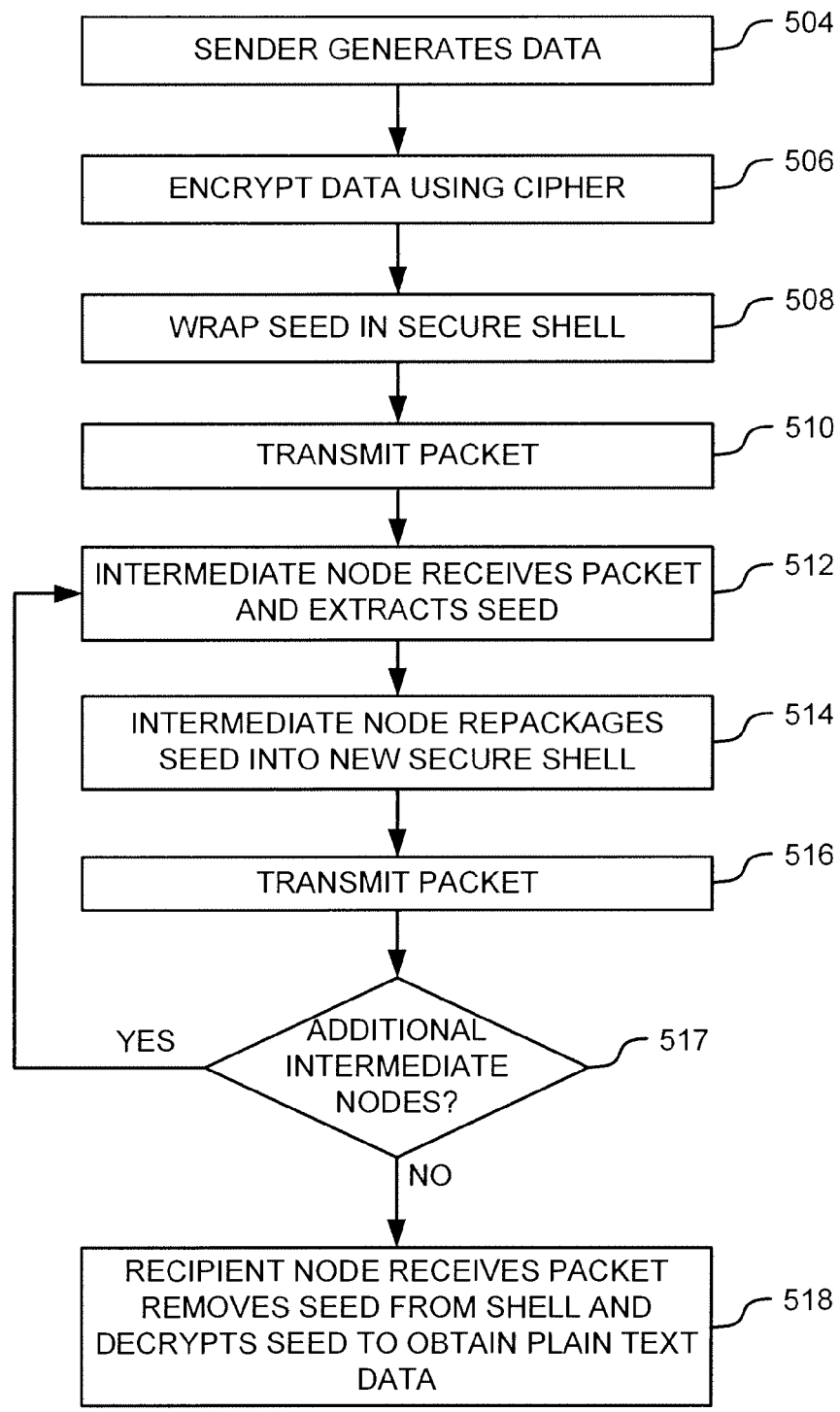
FIG. 11 is a flow diagram illustrating an example operation of the multi-hop network communication described in FIG. 10.

FIG. 10 is a diagram illustrating an example of a secure multi-hop network communication in accordance with one embodiment of the invention. FIG. 11 is a flow diagram illustrating an example operation of the multi-hop network communication described in FIG. 10. In this illustrated example, the example packet structure shown in FIG. 9 is used. Referring now to FIGS. 10 and 11, as shown in FIG. 10, this network communication is now described. In step 504, the sender 532 generates data 533. For example, the sender 532 can be a telemetry sensor that generates sensor data for transmission to the base station 552. In step 506, the sender node 532 encrypts the sensor data using an encryption algorithm. For example, this can be done with previously described algorithms using its device key array with an added timestamp. This forms the encrypted seed 535 (for example, seed 400), which also includes some embedded security and validation tools. Generally speaking, the seed 535 can be configured to include embedded prints of time and space when and where the sensor data (or other data) was generated. Preferably, these prints, as well as the data, cannot be recognized and modified by anyone except the base station, which has a copy of the same device key array. This provides high levels of security; even if any intermediate node in the packet's path is spoofed, the sensor data still will be protected and cannot be retrieved or modified by an intruder.

In step 508, the sender node 532 wraps the seed 535 in a unique protected secure shell 536 that serves as a secure transport container (or envelope). An example of this is shell 420 described above with reference to FIG. 9. In one embodiment, a unique neighbor key array is used to perform encryption of the secure shell. This neighbor key array can be unique for each neighbor of nodes in the network or environment. Fingerprints such as those described above with reference to FIGS. 2-8 can be used. Accordingly, encrypting a packet with unique neighbor key arrays helps to secure unintended recipient neighbors from decrypting the subject packet. In other words, this can be used to help ensure that the intended recipient, and only the intended recipient, can properly decrypt the data, even if there are other recipients within data communication range.

In step 510, the sensor node wirelessly transmits this protected packet. In step 512, an intermediate node 542 (i.e., a transmitter) receives the packet, extracts the seed 535 from the secure shell 536 using a copy of the predecessor's neighbor key array, validates the packet and sender, analyzes routing and trust information, and re-encrypts the seed. Where unique-neighbor key arrays are used, the intended successor node knows its predecessor node's neighbor key array and uses this key array to perform decryption for the secure shell. Ideally, this key array is unique to each node, and therefore, only this intended node can decrypt the shell. Note, as described above, a different key array—that of the intended recipient—is used to encrypt the seed, and, therefore, the next-neighbor or other intermediate nodes cannot decrypt the seed. Only the intended base-station recipient can decrypt the seed.

In step 514, the node re-packages the seed into a new secure shell 544 it encrypts with its neighbor key array. In step 516, the intermediate node forwards the shell to the next node if there are additional intermediate nodes before the intended recipient 552 is reached (operation 517). In this simplified example, only one intermediate node is shown, so the next node is the intended base station recipient. As would be understood after reading this description, additional intermediate nodes can be used in accordance with the systems and methods described herein.

In step 518, the intended recipient 552 receives and validates the packet, extracts the seed 535 from the secure shell 544, decrypts the seed, validates its original sender, and extracts the data in its original form. As one may see, in the illustrated example, the seed is transformed and looks unique from hop to hop. This is because of use of different unique neighbor fingerprints in the intermediate node re-encryptions.

Figure 12A:
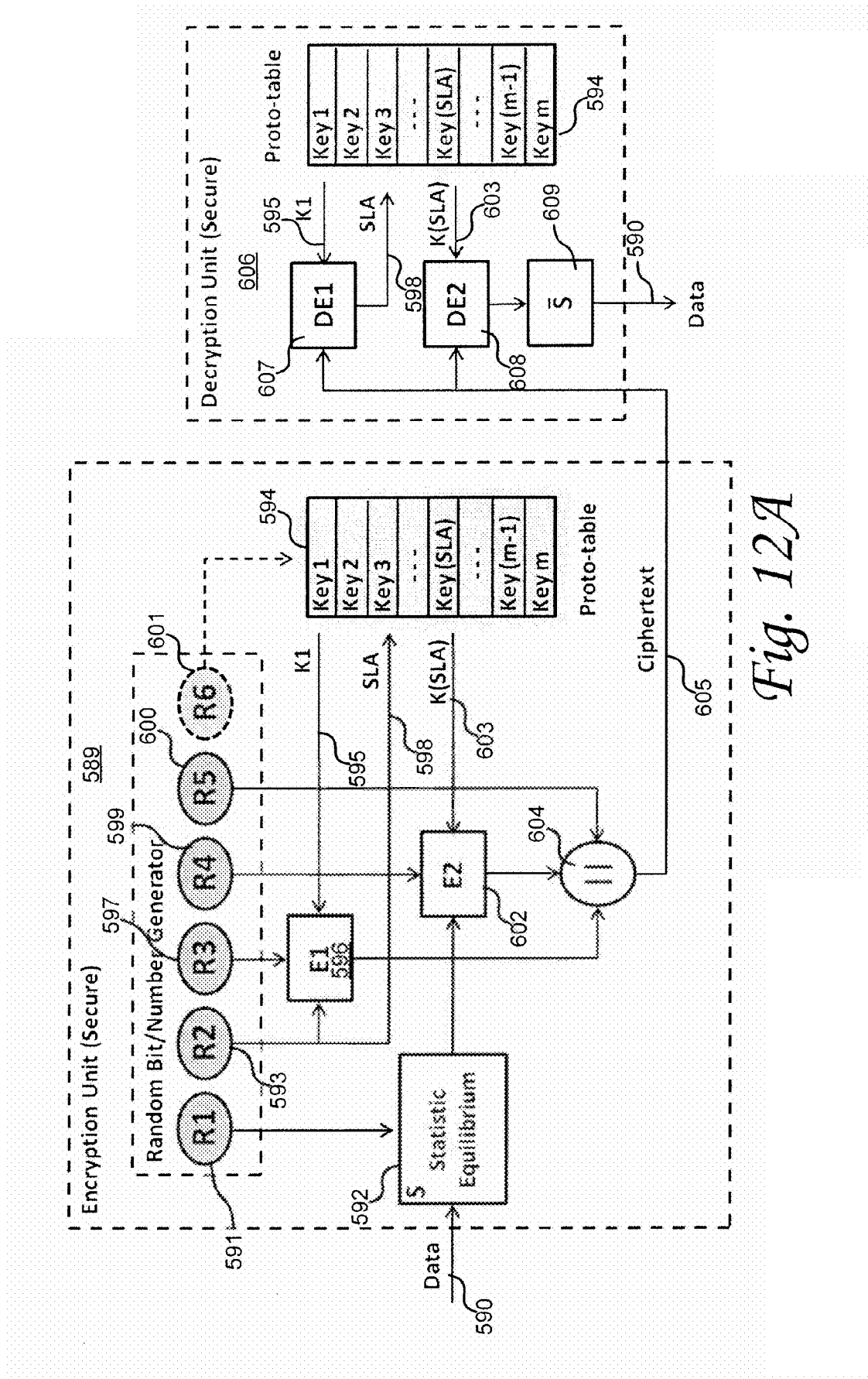
FIGS. 12A and 12B illustrates the operation of an encryption unit and a decryption unit according to embodiments of the invention.

In some embodiments, the general level of security provided by the encryption system may be increased by increasing the apparent size of the message space. For example, improving the a priori statistics for the inputs presented to the encryption algorithms may reduce the threat of chosen plain-text attacks. In these embodiments, randomized encryption includes a tool that provides smoothing out of the a priori statistics for the distribution of inputs to the encryption algorithm. FIG. 12A illustrates the operation of an encryption unit and a decryption unit according to such an embodiment of the invention. In this embodiment, prior to encryption, the data 590 is subjected to statistical smoothing in module 592. Mathematically, this function may be described as $S_{[R1]}(D)$, where S is a statistic improvement function 592 that uses a random generator R1 591 to smooth out the statistics of 0's and 1's in data D 590. As a simple example, the block of information could be divided on smaller sub-blocks, each with a small, randomly generated header (using random number generator 591). In other embodiments, other statistics smoothing techniques could be applied as well. In one embodiment, this can include conventional data compression techniques. In another embodiment, the keys from the key table used for encryption might be selected according to statistical smoothing. For example, in a packet based system, a single key might be used for encrypting the packet, and this key might be selected based on which key provides the smoothest cipher text. Such a process might comprise performing the encryption process using a plurality of potential encryption keys (such as the entire key table or a subset thereof), and selecting the key for the actual transmission that provides acceptable statistical smoothing.

In this embodiment, after statistical smoothing, encryption unit 589 encodes the smoothed data as described herein. For example, at a first stage, a random number generator R2 593 generates a random Start Key Index (SKI) 598 that is the number (or key index) that references a particular key from the set of keys 594 (the key array).

To allow the chosen recipient to decrypt the encrypted message, the recipient has a copy of the key array 594. As described herein, if an encrypting transmitter will be sending to multiple recipients, the same key array might be used amongst all of the devices. Alternatively, a plurality of key arrays may be dispersed throughout the communications network, in which case, the transmitter may have copies of the plurality of key arrays and be configured to select a key array from the plurality that corresponds to one owned by the intended recipient. Furthermore, decryption requires that the intended recipient know which key from the key array was used to encrypt the message. Accordingly, in this embodiment, the SKI 598 is encrypted using a predetermined key 595 and a random number from random number generator R3 597 at encryption module 596 and presented in each ciphertext. For example, random-size groups of random bits may be inserted between bits of the SKI 598 and the result may be concatenated 604 with the encrypted message such that the SKI 598 is hidden in the ciphertext 605. The degree of difficulty to recover the SKI from the ciphertext 605 can be made arbitrarily large; for example, because the SKI is random number a large enough key array (i.e., contains more than 500 random keys) makes it nearly impossible to recover the SKI 598 from the ciphertext 605. Accordingly, an adversary cannot learn which SKI was chosen to encrypt the message from ciphertext analysis. Mathematically, the result of this stage can be described as E1[K1, R3] (SKI[R2]). This means that an encryption function E1 596 uses a reference key K1 591 and a random bit generator R3 597 to encrypt a random SKI 598 (previously generated using random number generator R2). For example, the predetermined key K1 595 could be, the first key of the table or another predefined key from the key array. In a further, the predetermined key could be determined using other data likely to be known only by the sender and intended recipient. For example, the predetermined key could be determined from a GPS coordinate of the sender or receiver, from a biometric pattern known to the sender (for example, the sender could know the biometric pattern that would result when a recipient inputs his fingerprint into a fingerprint scanner), from other data such as a specific temperature at either of the locations or at an arbitrary location, or any other predetermined and shared scheme for choosing amongst any of these or other sources. In some cases, this information might comprises publicly available information that is chosen according to an a priori shared method, for example the temperature example. In other embodiments, privately available information, such as information available on a non-public GPS transmission channel might be employed.

In the next stage, encoder 589 uses encryption module E2 602 with key K(SKI) 603 (chosen from the key array encryption key and whose number (or key index) is equal to the SKI 598) and a random bit generator R4 599 to encrypt the smoothed input data 610. This data encryption process could comprise any method described herein—for example, an insertion of random size groups of random bits in data (increases the bandwidth) or using a bit-swapping technique (does not increase the bandwidth). In this embodiment, the size of each inserted group and the position of bits for bit-swapping are obtained from the encryption key K(SKI) 603. Thus, the same key could be used in both encryption techniques. Mathematically, the result of this stage is E2$_{[K(SKI), R4]}$ (S$_{[R1]}$(D)), which means that the previously statistically smoothed-out data D 610 is encrypted using encryption function E2 602, random bit generator R4 599, and the chosen key K 603, whose number in the key array 594 is equal to the SKI 603.

In some embodiments, different lengths of messages in bit-swapping techniques and random-size insertions in bit-insertion techniques can lead to ciphertexts having different lengths. Accordingly, for additional security in further embodiments, methods are provided to ensure that all ciphertexts have same size. In an example embodiment, a random-size random "tail" RT 611 should be generated using a random bit generator R5 600 and concatenated 604 to the ciphertext to provide equal-size ciphertexts 605.

Figure 13:
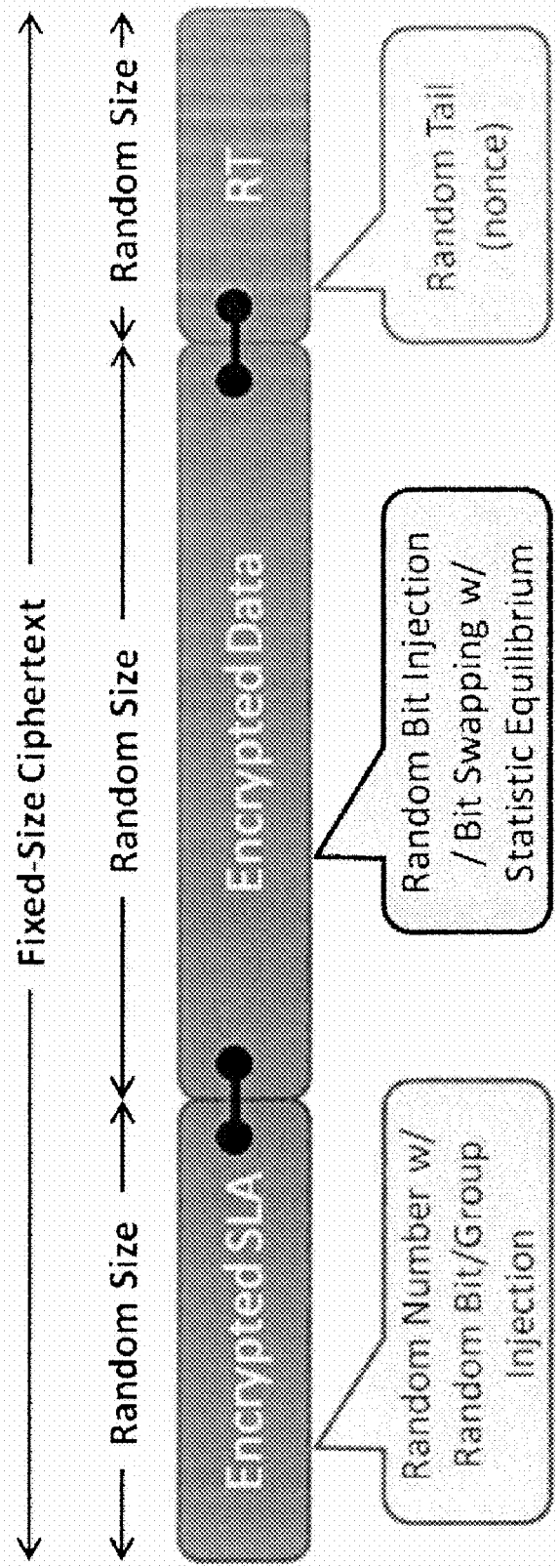
FIG. 13 illustrates an example ciphertext in accordance with one embodiment of the invention.

In summary, the encoder of the illustrated embodiment may be described by the formula, $$E1_{[K1,R3]}(SKI_{[R2]}) \| E2_{[K(SKI),R4]}(S_{[R1]}(D)) \| RT_{[R5]},$$

where the symbol || means concatenation. The result 605 output by the illustrated encoder 589 (output or ciphertext structure) is illustrated in FIG. 13.

Decryption unit 606 is configured to receive ciphertext 605 and to decrypt it according to the encryption method used. In the illustrated embodiment, the decryption unit uses its shared knowledge of the predetermined key K1 595 to retrieve the SKI 598 from the ciphertext 505 at decryption module 607. Then, the decryption unit 606 uses the key table 594 and the SKI 598 to determine the key corresponding to SKI 598, K(SKI) 603. Once this is obtained, the smoothed data may be retrieved at decryption module 608. The original message 590 may be obtained by inverting 609 the known smoothing process.

Figure 12B:
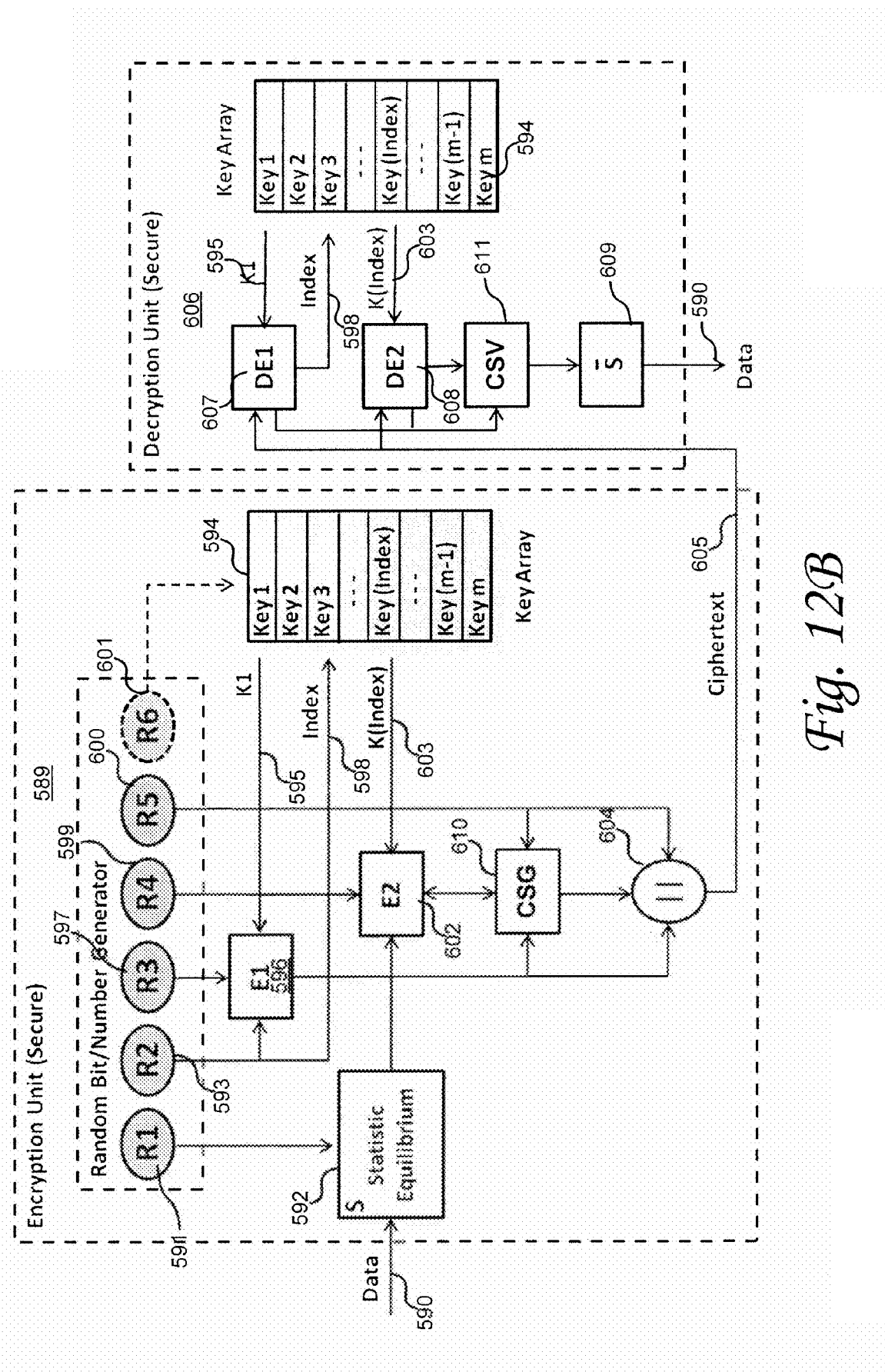

As described herein, in some embodiments, an encrypted MAC that is embedded in the ciphertext allows reliable authentication of valid ciphertexts and provides protection against bit modification attacks on the decoder. One implementation of MAC embedding using checksums is illustrated in FIG. 12B. In this embodiment, in addition to the elements described with respect to FIG. 12A, a checksum generator 610 is provided with the data that will be present in the eventual ciphertext 605 and uses this data along with any other conventional information to determine a checksum for the ciphertext 605. Correspondingly, in the decryption unit 606, a checksum verifier 611 is configured to verify that the checksum in the ciphertext 605 is valid. In some embodiments, if the checksum is not valid, then the checksum verifier 611 may automatically prevent the decrypted data from being presented to the inverter 609. In further embodiments, the checksum verifier 611 may provide an alert to a system operator.

Although the embodiments of FIGS. 12A and B were described using a plurality of random bit generators, R1-R6, for practical implementation, the same random bit generator may be used as source of R1-R5. Furthermore, in some embodiments the key array itself contains previously generated and saved random keys using random key generator R6. Thus, in the proposed cryptographic system, several random processes are combined and used to provide ultimate security of encryption.

The above examples describe structures and algorithms for securing data for transmission and storage. The examples may be simplified. Some applications do not require as high a level of security as other applications (e.g., military applications) may require. Examples may be chosen with the appropriate proportion of security and cost for any particular application. For example, the packet may begin with a sender key index, either encrypted or not. This will simplify the sender identification by its neighbors, but should slightly reduce security in the system because each fixed field can be modified by an intruder. As another example: the encrypted data swapping (double encryption) may be eliminated, simplifying the seed, and again reducing the level of security and protection. Or, for example, all nodes may have same neighbor key array and use only one kind of secure shell (transport container). In this case, if one node from a network is spoofed, it may open the door to DoS or rerouting electronic attacks; however, the sensor data will remain protected. The exemplary data packet structure and communication algorithms described above can be implemented to securely and reliably protect the data and communication in the network, yet reduce processing and communication overhead.

Figure 14:
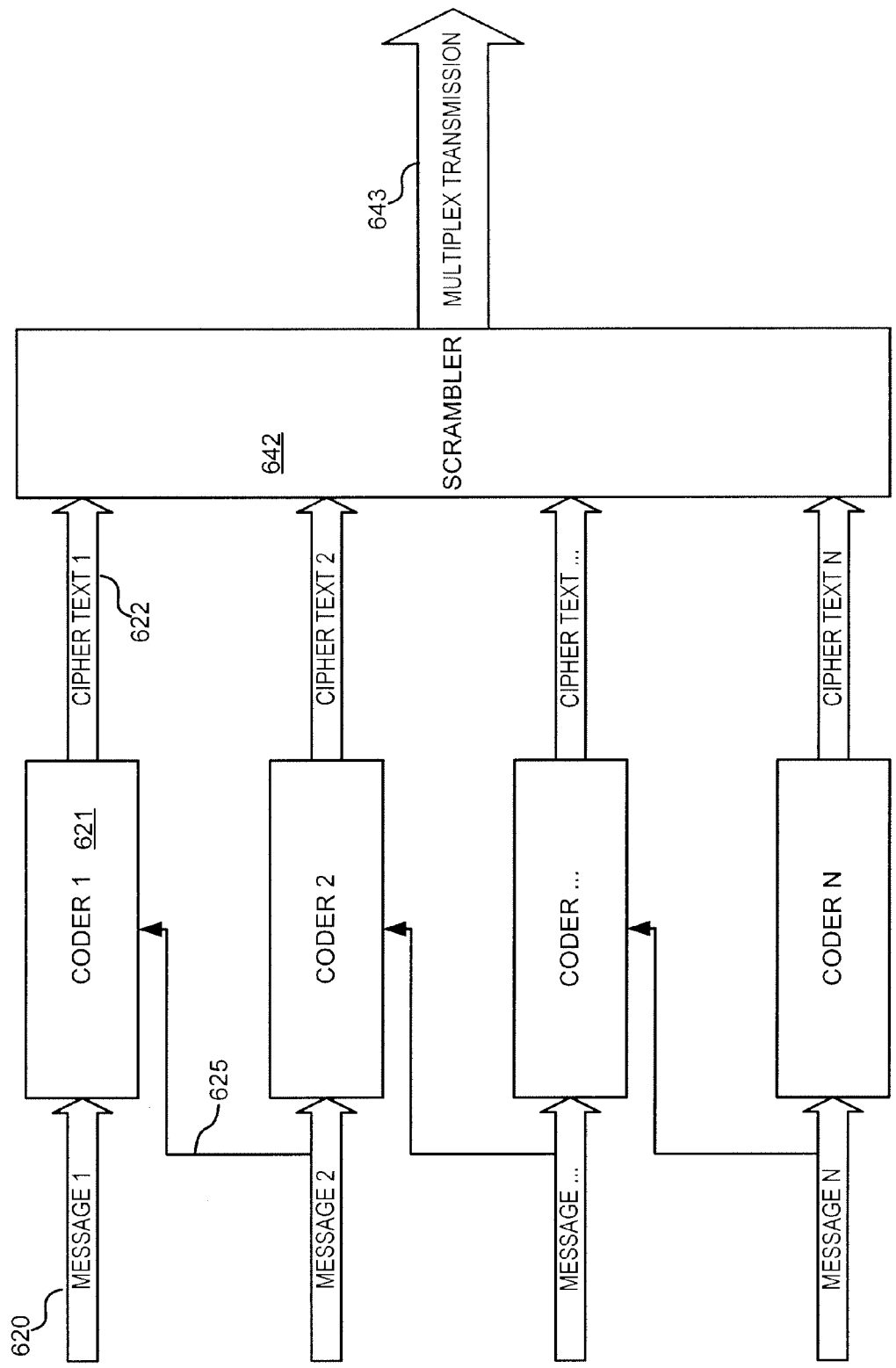
FIG. 14 illustrates a system for mutliplexed coding according to an embodiment of the invention.

In further embodiments, additional levels of security may be provided through various multiplexing methods. FIG. 14 illustrates a system implementing one such method in accordance with embodiments of the invention. In this embodiment, multiple messages 620 are provided to a corresponding multiple number of coder modules 621. In some cases messages 620 may comprise actual separate messages destined for a different locations, or messages 620 might comprise parallel message streams of a single message that had been passed through a serial to parallel module. In the illustrated embodiment, the coder modules 621 encode the messages 620 using a method similar to that described with respect to FIG. 5. However, rather than using a random source of insertion bits or nonce bits, a coder uses a message intended for another coder 625 as the source of insertion. For example, message 2 is used as the source for insertion bits for coder 1, and so on. Although not illustrated, cyclically, message 1 may be used for the source of insertion bits for coder N. In this embodiment using other messages as a source of insertion bits may reduce the need for a statistical encoding method as the insertion bits will have statistical distributions similar to that of the information bits because they are messages as well. Even in embodiments using statistical encoding methods, this may serve as a further source of robustness for statistical smoothing.

The illustrated embodiment further makes use of multiplex transmissions for increased security. In multiplex transmissions, a message is transmitted over a plurality of subchannels. For example, in time division multiplexing a communications channel may be divided into a plurality of subchannels comprising timeslots. And multiplex communications may comprise mapping the message to a plurality of such timeslots. As another example, an orthogonal frequency division multiplexing, a message is divided up and transmitted simultaneously over a plurality of frequency subcarriers. In addition to any inherent security again through the use of multiple sub channels for communication, predetermined methods of multiplex mapping to subchannels may be used to add levels of randomness or pseudo-randomness to the communication system. For example, in the illustrated embodiment the plurality of ciphertext 622 may be transmitted over a corresponding plurality of communications of subchannels. For example, a single initial message may be divided into a plurality of messages 620, for example 16 messages. In this embodiment, the plurality of coder's 621 may be configured to share the same sequence generator and may share the same key tables. After coding, the resulting plurality of ciphertext is transmitted over a corresponding plurality of subchannels. In the particular example, the 16 ciphertexts might be transmitted over 16 subchannels.

Additionally, in this embodiment the coders may operate in a sequential manner in the sequence generator may be clocked after each coder encodes its current message. Accordingly, to decode the message using the correct key table sequence, the order of the sub messages must be reassembled by the decoder. However, rather than mapping the ciphertext to the subchannels in an orderly fashion, the ciphertext may be mapped to the subchannels in a private manner known only to the receiver and transmitter. For example, a scrambling module 642 may be configured to randomly or pseudo-randomly map different ciphertext two different subchannels. In some embodiments, the same key table can be used for message (or bit) to channel mapping. The specific mapping used in the communication may then be provided to the receiver, for example through the use of a third-party or separate communications channel, or another my embodiments may be derived independently by the receiver, for example an equivalent pseudorandom process that was used by the scrambler 642. This multiplexed transmission 643 may then be de-modulated and reassembled into the proper order by the receiver.

In further embodiments, additional security levels may be obtained by utilizing data sources that are known to each party but do not need to be transmitted in various methods and subroutines described above. For example, before system deployment the receiving party any transmitting parties may agree on a shared data source that will be used in various predetermined components or methods. For example, the parties may agree to update a key sequence initialization data and a predetermined period using an agreed data source comprising the temperature of a predetermined location at the predetermined update time. In some embodiments, it may be difficult to use such sources of shared information to determine sufficient extra data for increased security. In such embodiments, various methods may be used to extend the useful amount of data provided by such a shared information source. For example, in the predetermined temperature example 8 bits of data may reasonably be obtained from the temperature of a single location and a predetermined update time. However, this amount of shared information may be extended by using the initial shared information in a further shared method of the data extension. For example, the eight bits of data may be used as a seed for an eighth order pseudorandom number generator. This eighth order pseudorandom number generator may be configured to provide all $2^8$ possible eight bit numbers in an order in a pseudorandom order that is determined by the initial seed. Accordingly, the initial temperature seed may be used to generate a 256 bit (32 byte) number that may be used in encoding and decoding methods as described herein. In this temperature example, the 256 bit number may be used as an initial number for a key table, thereby avoiding transmitting the initial key index to the receiving device.

Various methods of key management may be employed in different embodiments. These key management methods may comprise various protocols or rules for key table updates, key table maintenance procedures, or key table distributions. In some embodiments, key tables are distributed to various communicating parties using trusted couriers. Furthermore, methods of securing the key tables while in possession of the trusted couriers may be implemented. In a particular embodiment, key tables are distributed using anti-tamper and tamper evident devices, for example of the type described in U.S. Pat. No. 7,556,532, issued on Jul. 7, 2009, which is hereby incorporated by reference.

In other embodiments, key tables may be distributed over a network communications medium, such as the same network used for the security communications described herein. In such embodiments, the key tables may be secured through additional security methods. In some embodiments, transmitters and receivers could be provided with a master key table, for example using a trusted courier or during manufacture, and this master key table could be used to generate tables for communication session keys for use in particular communications sessions. For example, a plurality of master keys in the master key table could be used in encrypted key exchange methods to generate a session specific shared key table. In further embodiments, the shared key table 41 be derived from other information provided to the transmitter and the receiver. For example, a shared array of large prime numbers might be provided to the transmitter and receiver, which can then use these numbers to derive a shared key table, such as through a simple password exponential key exchange protocol.

In still further embodiments, other methods of key distribution might be employed, such as asymmetric key distribution methods. For example, in a particular embodiment the key tables are encrypted using a public key encryption algorithm, wherein the key table receiver is provided with a private key that it can use to recover the transmitted key table. As another example, the key table may be encrypted using a private key that is shared between the encoding and decoding parties using a quantum cryptographic key distribution system, such as the BB84 protocol. In still further embodiments, combinations of these or other methods may be used for key table distributions. For example, a key table may be divided into various parts, and the parts may be transmitted separately, either over or different physical channels or on the same physical channel using different methods. For example, a trusted courier may deliver a first portion of a key table, while public key encryption may be used to deliver the second portion of the key table.

In these embodiments, key table maintenance procedures might comprise storing the key table during a agreed-upon key table lifetime according to a predetermined protocol or rule. For example, the key table may be stored on a computer security card that is removable from the decoding and encoding devices. In this example methods or procedures may be employed in the decoding and encoding devices to ensure that the key table is not stored in any form of memory after the computer security card is removed. Accordingly, in such embodiments the key table is secured from physical acquisition so long as the computer security card is maintained in a physically secure manner.

In still further embodiments, power used for device operation may reduced or minimized maintain the same key table for a device lifetime, or for an extended period. In a particular embodiment, such as described with respect to FIG. 10, the encrypting and decrypting transceivers may comprise sensors within a wireless sensor network. For example, in some environments, these sensors may be self-powered and deployed in a non-accessible manner such that operating lifetime is a priority. In such embodiments, each sensor node may be equipped with a key table that is used for the device's lifetime. Accordingly, the sensor life may be extended because the sensor is not required to expend power for the computations required to derive session specific keys.

Figure 15:
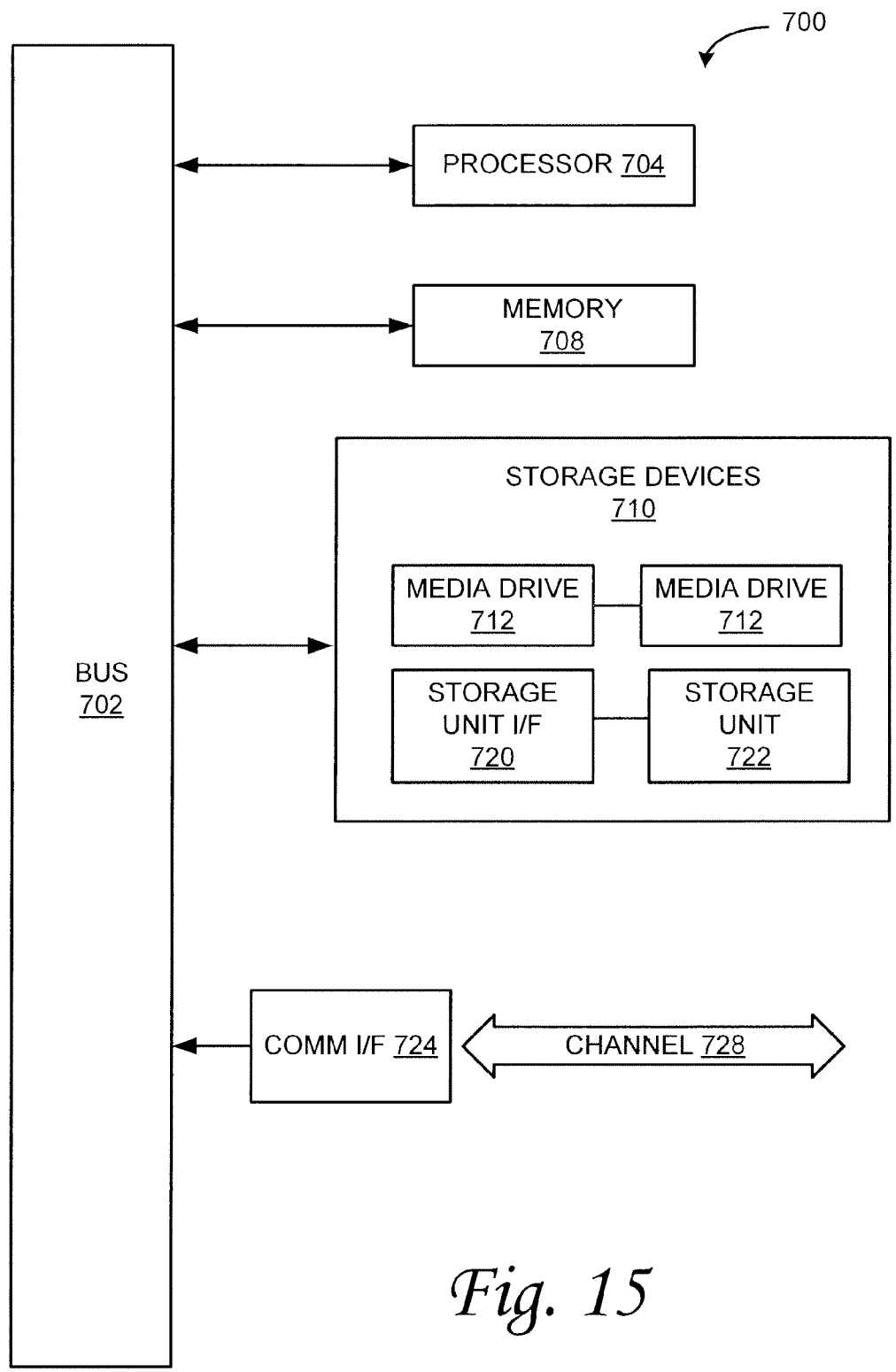
FIG. 15 illustrates an example computing module that may be used to implement various features of an embodiment of the invention.

The examples described herein and in other implementations of the invention may be implemented utilizing any form of tool, whether hardware, software, or a combination thereof. For example, one or more processors, controllers, ASICs, PLAs, logical components, software routines or other mechanisms might be implemented in an embodiment of the present invention. In implementation, the various portions of examples described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules or portions, one of ordinary skill in the art will understand that these features and functionality can be shared among one or more common software and hardware elements, and such description shall not require or imply that separate hardware or software components are used to implement such features or functionality. The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Where components or modules of the invention are implemented in whole or in part using software, in one embodiment, these software elements can be implemented to operate with a computing or processing module capable of carrying out the functionality described with respect thereto. One such example computing module is shown in FIG. 15. Various embodiments are described in terms of this example-computing module 700. After reading this description, it will become apparent to a person skilled in the relevant art how to implement the invention using other computing modules or architectures.

Referring now to FIG. 15, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some foil of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 714 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein may be described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for a data encryption device to perform network communications, the method comprising:
    obtaining an indexed array of encryption keys, wherein the indexed array of encryption keys is shared with a data decryption device; obtaining a message to be encrypted; using a first random or pseudorandom number to determine an index;
    obtaining a first key from the array of encryption keys, wherein the first key corresponds to the index;
    selecting a second key from the plurality of encryption keys;
    encrypting the message using the first key and a second random or pseudorandom number, wherein a first portion of the message is encrypted using the first key and wherein a second portion of the message is encrypted using a third key, the third key having a second index determined from the first index in a deterministic manner known to the data decryption device;
    encrypting the index using the second key and a third random or pseudorandom number;
    transmitting the encrypted message and the encrypted index to the data decryption device.

2. The method of claim 1, further comprising modifying the first key to generate a modified first key corresponding to the index for use in subsequent network communications.

3. The method of claim 1, wherein the indexed array of encryption keys is obtained from a master indexed array of encryption keys stored on the data encryption device using a predetermined key derivation procedure.

4. The method of claim 1, further comprising combining the encrypted message and the encrypted index to form a ciphertext; and wherein the steps of transmitting the encrypted message and the encrypted index comprise transmitting the ciphertext.

5. The method of claim 4, wherein the ciphertext further comprises added bits such that a length of the ciphertext is substantially equal to a predetermined ciphertext length.

6. The method of claim 5, wherein the added bits comprise a random tail and wherein the ciphertext further comprises a checksum and a timestamp.

7. The method of claim 1, further comprising generating a message authentication code for the encrypted message and the encrypted index; and transmitting the message authentication code to the data decryption device.

8. The method of claim 4, wherein the second key is determined using information shared with the data decryption device.

9. The method of claim 1, wherein the step of encrypting the message comprises inserting a group of randomly or pseudorandomly generated bits at a location of the message determined using the first key.

10. The method of claim 9, wherein the length of the group of randomly or pseudorandomly generated bits is random or pseudorandom.

11. The method of claim 1, wherein the step of encrypting the message comprises obtaining a first bit of the message and using the first key to determine a position of a second bit of the message and transposing the first bit with the second bit.

12. The method of claim 1, wherein the step of encrypting the message further comprises using a third key, and wherein the third key is deterministically obtained from first key using a function known to the data decryption device.

13. The method of claim 1, further comprising statistically smoothing the frequencies of the message characters using a statistic improvement function known to the data decryption device.

14. The method of claim 1, wherein the first random or pseudorandom number is determined as an index of a key of the key array resulting in a statistically smooth encrypted message.

15. The method of claim 1, wherein the indexed array of encryption keys is programmed onto the data encryption device prior to deploying the data encryption device.

16. The method of claim 1, wherein the first key comprises a sequence of bits determined using a fourth random or pseudorandom number.

17. The method of claim 16, wherein the step of encrypting the message is further performed using a biometric pattern, a telemetry datum, or a GPS coordinate.

18. The method of claim 16, wherein the sequence of bits of the first key is further determined at a sending location using a first biometric pattern, a first telemetry datum, or a first GPS coordinate, and the sequence of bits of the first key is determined a receiving location using a different biometric pattern, a different telemetry datum, or a different GPS coordinate.

19. The method of claim 1, wherein the array of encryption keys is shared with only a proper subset of a plurality of decryption devices that receive the encrypted message and the encrypted index.

20. The method of claim 1, wherein the array of encryption keys is selected from a plurality of arrays of encryption keys wherein a first array of encryption keys is shared with a first decryption device and a second array of encryption keys is shared with a different decryption device.

21. The method of claim 20, wherein the array of encryption keys is selected such that the different decryption device is unable to decrypt the encrypted message.

22. The method of claim 4, further comprising encrypting the ciphertext using a transport encryption key array, wherein the transport encryption key array is shared with an intermediary decryption device.

23. The method of claim 22, wherein the transport encryption key array is transmitted to the intermediary decryption device.

24. The method of claim 4, wherein the step of receiving the message comprises receiving a second ciphertext encrypted using a transport encryption key array and decrypting the message from the second ciphertext using the transport encryption key array.

25. The method of claim 24, wherein the message comprises a third ciphertext encrypted using a device encryption key array.

26. The method of claim 25, wherein the transport encryption key array, the indexed array of encryption keys, and the device encryption key array are distinct.

27. The method of claim 24, wherein the step of decrypting the message using the transport encryption key array comprises attempting to decrypt the message using multiple encryption key arrays selected from a plurality of encryption key arrays and the transport key array comprises a encryption key array that enables successful decryption.

28. The method of claim 27, further comprising identifying a sending network device according to the transport encryption key array.

29. The method of claim 1, wherein the step of encrypted the index is performed before the step of encrypted the message.

30. A communications device comprising: a non-transitory computer readable medium having computer executable logic embodied thereon, wherein the computer executable logic is configured to cause the communications device to perform the steps of:
obtaining an indexed array of encryption keys, wherein the indexed array of encryption keys is shared with a data decryption device;
obtaining a message to be encrypted;
using a first random or pseudorandom number to determine an index;
obtaining a first key from the array of encryption keys, wherein the first key corresponds to the index;
selecting a second key from the plurality of encryption keys;
encrypting the message using the first key and a second random or pseudorandom number, wherein a first portion of the message is encrypted using the first key and wherein a second portion of the message is encrypted using a third key, the third key having a second index determined from the first index in a deterministic manner known to the data decryption device;
encrypting the index using the second key and a third random or pseudorandom number;
transmitting the encrypted message and the encrypted index to the data decryption device.

31. The communications device of claim 30, wherein a first portion of the message is encrypted using the first key and wherein a second portion of the message is encrypted using a third key, the third key having a second index determined from the first index in a deterministic manner known to the data decryption device.

32. The communications device of claim 30, wherein the computer executable logic is further configured to cause the communications device to perform the step of modifying the first key to generate a modified first key corresponding to the index for use in subsequent network communications.

33. The communications device of claim 30, wherein the computer executable logic is further configured to cause the communications device to perform the step of combining the encrypted message and the encrypted index to form a ciphertext; and wherein the steps of transmitting the encrypted message and the encrypted index comprise transmitting the ciphertext.

34. The communications device of claim 33, wherein the ciphertext further comprises added bits such that a length of the ciphertext is substantially equal to a predetermined ciphertext length.

35. The communications device of claim 34, wherein the computer executable logic is further configured to generate a message authentication code for the encrypted message and the encrypted index and transmit the message authentication code to the data decryption device.

36. The communications device of claim 34, wherein the added bits comprise a random tail and wherein the ciphertext further comprises a checksum and a timestamp.

37. The communications device of claim 33, wherein the second key is determined using information shared with the data decryption device.

38. The communications device of claim 30, wherein the step of encrypting the message comprises inserting a group of randomly or pseudorandomly generated bits at a location of the message determined using the first key.

39. The communications device of claim 38, wherein the length of the group of randomly or pseudorandomly generated bits is random or pseudorandom.

40. The communications device of claim 30, wherein the step of encrypting the message comprises obtaining a first bit of the message and using the first key to determine a position of a second bit of the message and transposing the first bit with the second bit.

41. The communications device of claim 30, wherein the step of encrypting the message further comprises using a third key, and wherein the third key is deterministically obtained from first key using a function known to the data decryption device.

42. The communications device of claim 30, wherein the computer executable logic is further configured to cause the communications device to perform the step of statistically equalizing the frequencies of the message characters using a statistic improvement function known to the data decryption device.

43. The communications device of claim 30, wherein the indexed array of encryption keys is programmed onto the data encryption device prior to deploying the data encryption device.

44. The communications device of claim 30, wherein the first key comprises a sequence of bits determined using a fourth random or pseudorandom number.

45. The communications device of claim 44, wherein the sequence of bits of the first key is further determined using a biometric pattern, a telemetry datum, or a GPS coordinate.

46. The communications device of claim 45, wherein the sequence of bits of the first key is determined at a sending location using a first biometric pattern, a first telemetry datum, or a first GPS coordinate, and the sequence of bits of the first key is determined a receiving location using a different biometric pattern, a different telemetry datum, or a different GPS coordinate.

47. The communications device of claim 30, wherein the array of encryption keys is shared with only a proper subset of a plurality of decryption devices that receive the encrypted message and the encrypted index.

48. The communications device of claim 30, wherein the array of encryption keys is selected from a plurality of arrays of encryption keys wherein a first array of encryption keys is shared with a first decryption device and a second array of encryption keys is shared with a different decryption device.

49. The communications device of claim 48, wherein the array of encryption keys is selected such that the different decryption device is unable to decrypt the encrypted message.

50. The communications device of claim 33, wherein the computer executable logic is further configured to cause the communications device to perform the step of encrypting the ciphertext using a transport encryption key array, wherein the transport encryption key array is shared with an intermediary decryption device.

51. The communications device of claim 50, wherein the transport encryption key array is transmitted to the intermediary decryption device.

52. The communications device of claim 33, wherein the step of receiving the message comprises receiving a second ciphertext encrypted using a transport encryption key array and decrypting the message from the second ciphertext using the transport encryption key array.

53. The communications device of claim 52, wherein the message comprises a third ciphertext encrypted using a device encryption key array.

54. The communications device of claim 53, wherein the transport encryption key array, the indexed array of encryption keys, and the device encryption key array are distinct.

55. The communications device of claim 52, wherein the step of decrypting the message using the transport encryption key array comprises attempting to decrypt the message using multiple encryption key arrays selected from a plurality of encryption key arrays and the transport key array comprises a encryption key array that enables successful decryption.

56. The communications device of claim 55, wherein the computer executable logic is further configured to cause the communications device to perform the step of identifying a sending network device according to the transport encryption key array.

57. A method for a data decryption device to receive network communications, the method comprising:
- obtaining an indexed array of encryption keys, wherein the indexed array of encryption keys is shared with a data encryption device;
- obtaining an encrypted message, wherein the encrypted message was encrypted using the indexed array of encryption keys, wherein a first portion of the message is encrypted using the first key and wherein a second portion of the message is encrypted using a third key, the third key having a second index determined from the first index in a deterministic manner known to the data decryption device;
- obtaining an encrypted index;
- decrypting the encrypted index to obtain an index corresponding to a key of the array of encryption keys;
- selecting the key from the array of encryption keys using the index;
- decrypting the message using the key;
- providing the decrypted message.

58. The method of claim 57, wherein the step of decrypting the encrypted index is performed using a second key determined using information shared with the data encryption device.

59. The method of claim 57, wherein the step of decrypting the message comprises removing a group of randomly or pseudorandomly generated bits at a location of the message determined using the key.

60. The method of claim 57, wherein the step of decrypting the message further comprises obtaining a first bit of the encrypted message and using the key to determine a position of a second bit of the message and transposing the first bit with the second bit.

61. The method of claim 57, further comprising obtaining a message authentication code derived from the encrypted message and encrypted index, and authenticating the encrypted message and encrypted index using the message authentication code.

62. The method of claim 57, wherein the step of decrypting the message further comprises using a second key, and wherein the second key is deterministically obtained from first key using a function known to the data decryption device.

63. The method of claim 57, wherein the first key comprises a sequence of bits determined using a random or pseudorandom number.

64. The method of claim 57, wherein the step of decrypting the message is further performed using a biometric pattern, a telemetry datum, or a GPS coordinate.

65. The method of claim 63, wherein the sequence of bits of the first key is further determined at a sending location using a first biometric pattern, a first telemetry datum, or a first GPS coordinate, and the sequence of bits of the first key is determined a receiving location using a different biometric pattern, a different telemetry datum, or a different GPS coordinate.

* * * * *